United States Patent
Kamada et al.

(10) Patent No.: US 6,347,156 B1
(45) Date of Patent: Feb. 12, 2002

(54) DEVICE, METHOD AND STORAGE MEDIUM FOR RECOGNIZING A DOCUMENT IMAGE

(75) Inventors: Hiroshi Kamada; Katsuhito Fujimoto, both of Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/216,712

(22) Filed: Dec. 21, 1998

(30) Foreign Application Priority Data

May 27, 1998 (JP) .......................................... 10-145322

(51) Int. Cl.⁷ ............................. G06K 9/00; G06K 9/32; G06K 9/46; H04N 1/40; H04N 1/41
(52) U.S. Cl. ....................... 382/237; 382/162; 382/164; 382/165; 382/169; 382/181; 382/190; 382/299; 382/300; 358/429; 358/455
(58) Field of Search ................................ 382/162, 164, 382/165, 166, 169, 173, 176, 181, 190, 195, 237, 299, 321, 205, 232, 300; 358/448, 455, 500, 429

(56) References Cited

U.S. PATENT DOCUMENTS

| | | | | |
|---|---|---|---|---|
| 5,128,748 A | * | 7/1992 | Murakami et al. | 358/500 |
| 5,274,471 A | * | 12/1993 | Kim | 358/455 |
| 5,583,659 A | * | 12/1996 | Lee et al. | 358/455 |
| 5,742,703 A | * | 4/1998 | Lin et al. | 382/176 |
| 5,781,658 A | * | 7/1998 | O'Gorman | 382/172 |
| 5,809,167 A | * | 9/1998 | Al-Hussein | 382/190 |
| 5,850,466 A | * | 12/1998 | Schott | 382/141 |
| 5,875,268 A | * | 2/1999 | Miyake | 382/276 |
| 6,055,336 A | * | 4/2000 | Niki | 382/237 |

FOREIGN PATENT DOCUMENTS

| | | |
|---|---|---|
| JP | 1-243668 | 9/1989 |
| JP | 2-9268 | 1/1990 |

* cited by examiner

Primary Examiner—Leo Boudreau
Assistant Examiner—Daniel G. Mariam
(74) Attorney, Agent, or Firm—Staas & Halsey LLP

(57) ABSTRACT

A color image input from a document image inputting unit is converted into a gray-scale image by a brightness image extracting unit. The gray-scale image is then converted into an image having a higher resolution according to the resolution of the original gray-scale image. When this conversion is performed, subpixels are generated between the original pixels, and the values of the subpixels are obtained with an interpolation method. Furthermore, a threshold value for a binarization process is generated by using an original pixel value and a subpixel value. The characters included in the binarized image are recognized by a binary image recognizing unit, and a recognition result is output from a recognition result outputting unit.

54 Claims, 19 Drawing Sheets

(150 dpi TEXT IMAGE IN FULL COLOR)

NOTE) VARIOUS COLORS CAN BE IDENTIFIED AROUND CHARACTERS IN COLOR DISPLAY

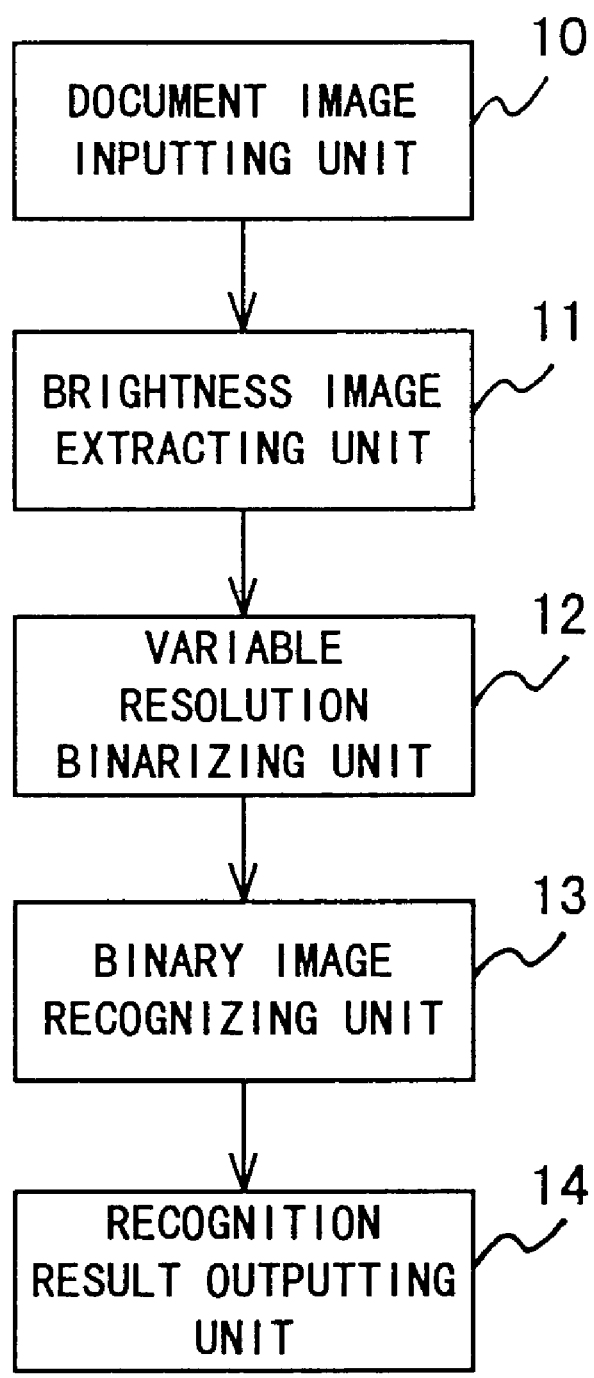
F I G. 2

| RESOLUTION OF INPUT IMAGE | PARAMETER FOR SUBPIXEL GENERATION PROCESS |
|---|---|
| 100 | 6 |
| 150 | 3 |
| ⋮ | ⋮ |

FIG. 5

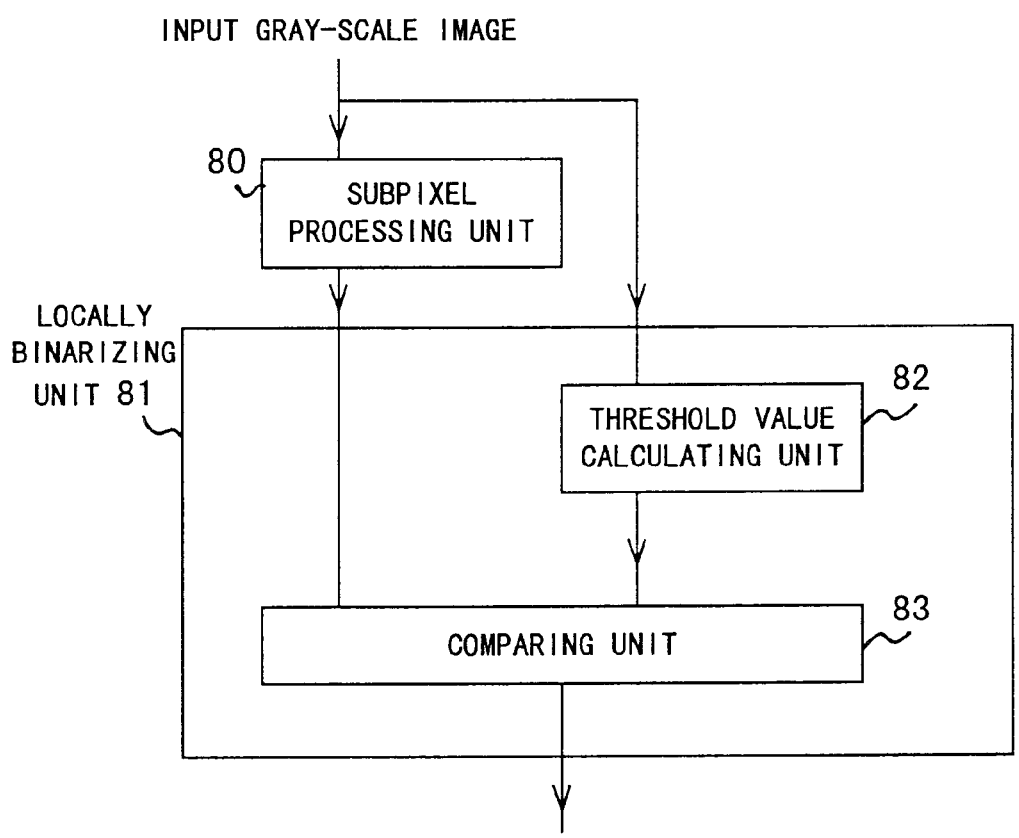
F I G. 9

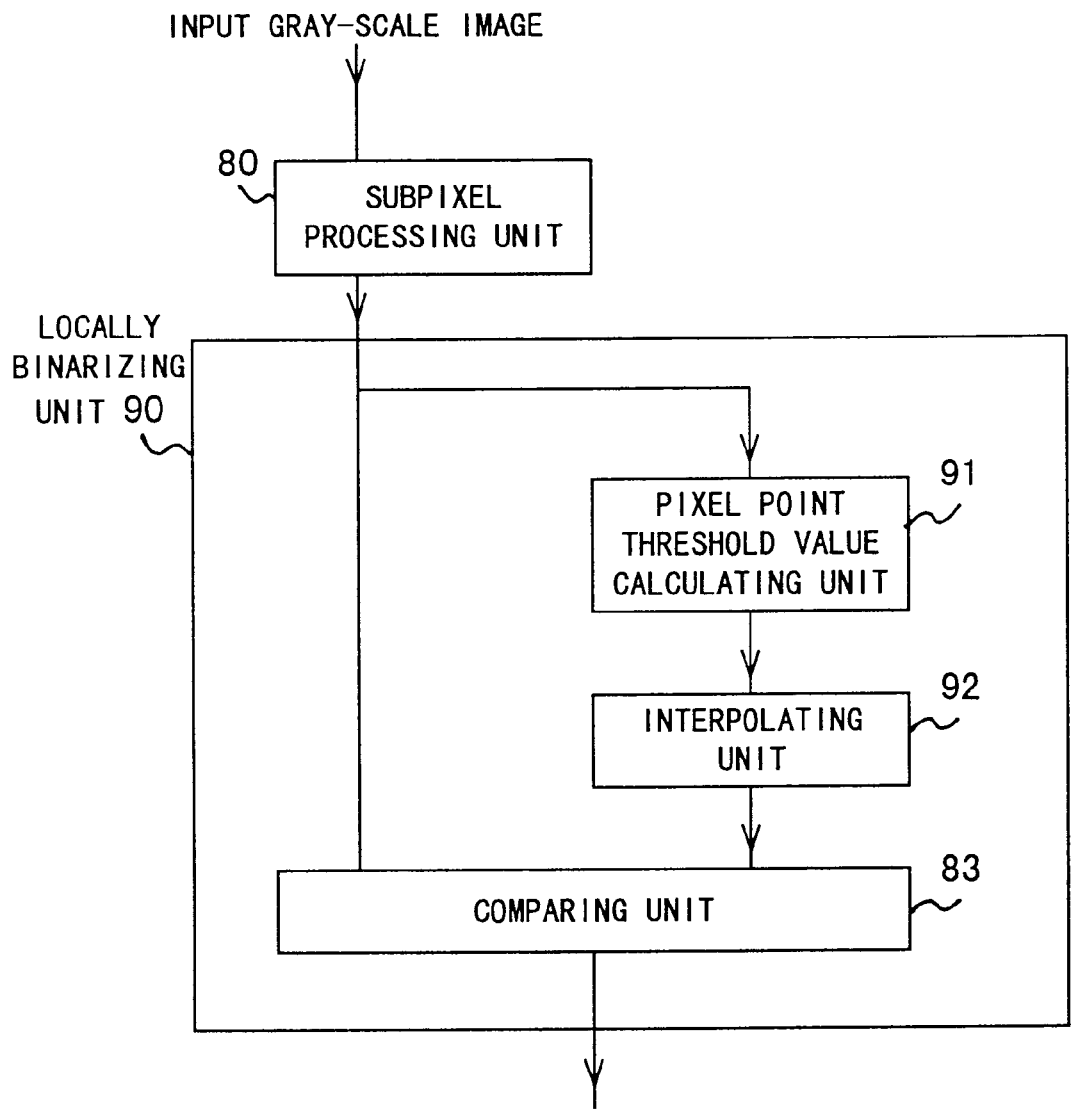
F I G. 1 0

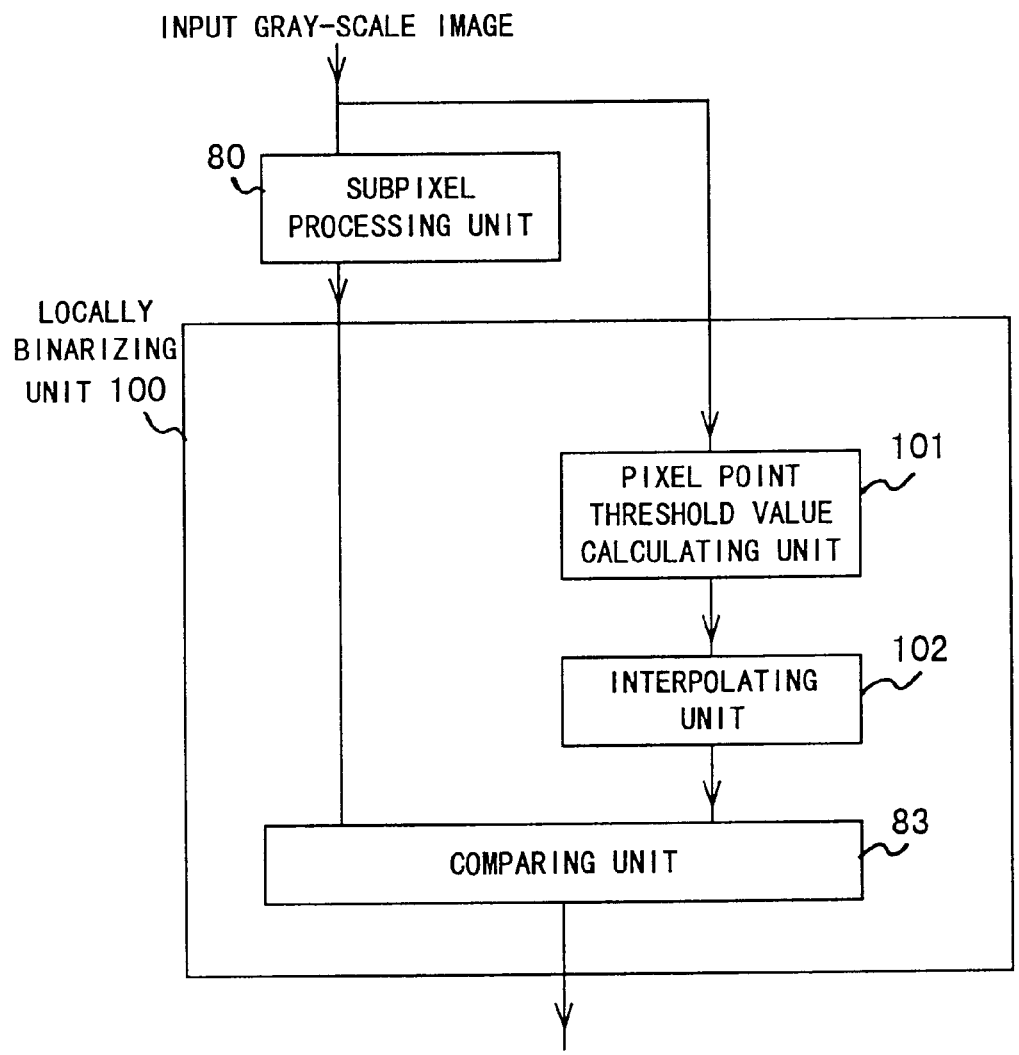
F I G. 1 1

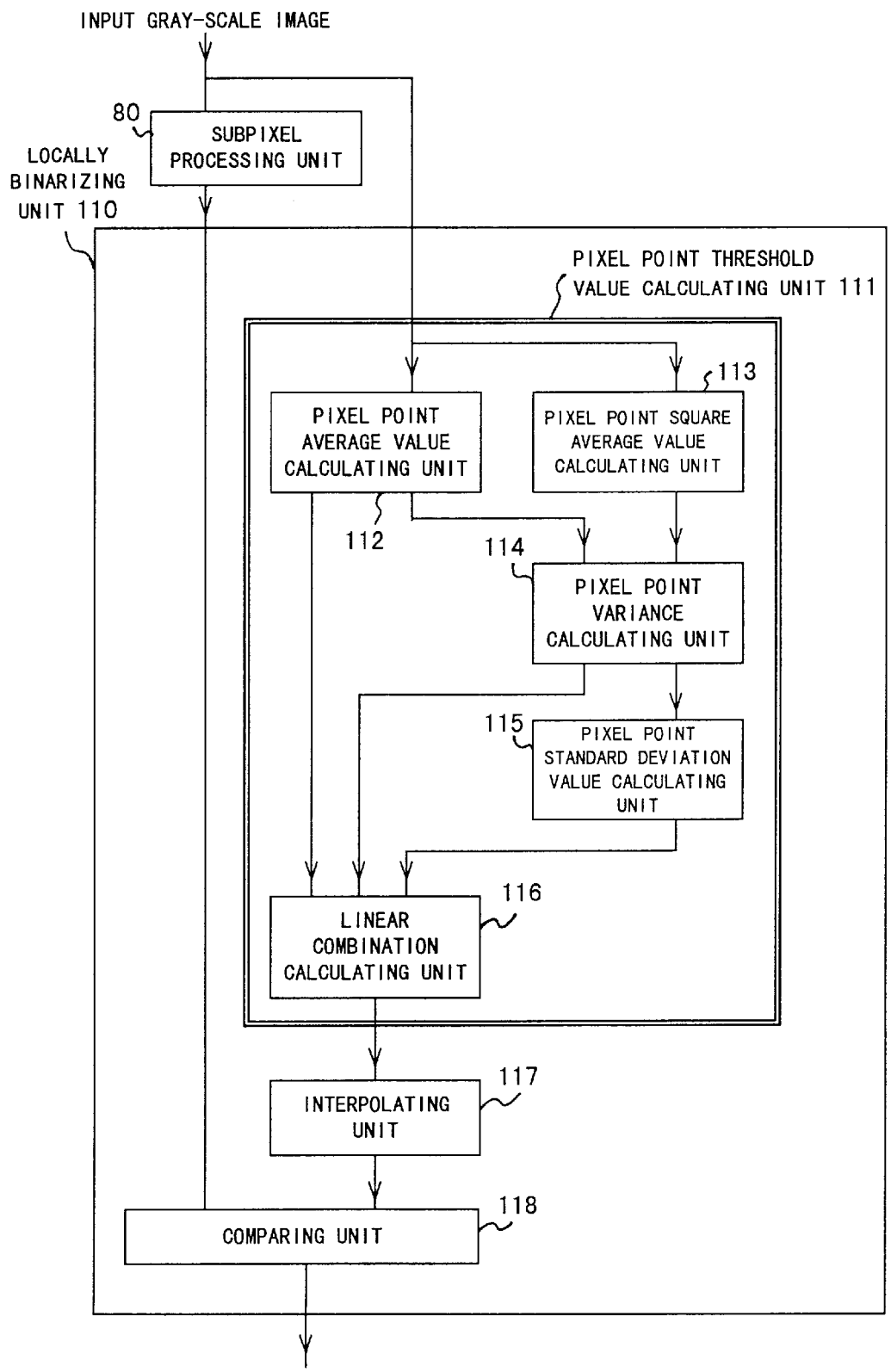
F I G. 1 2

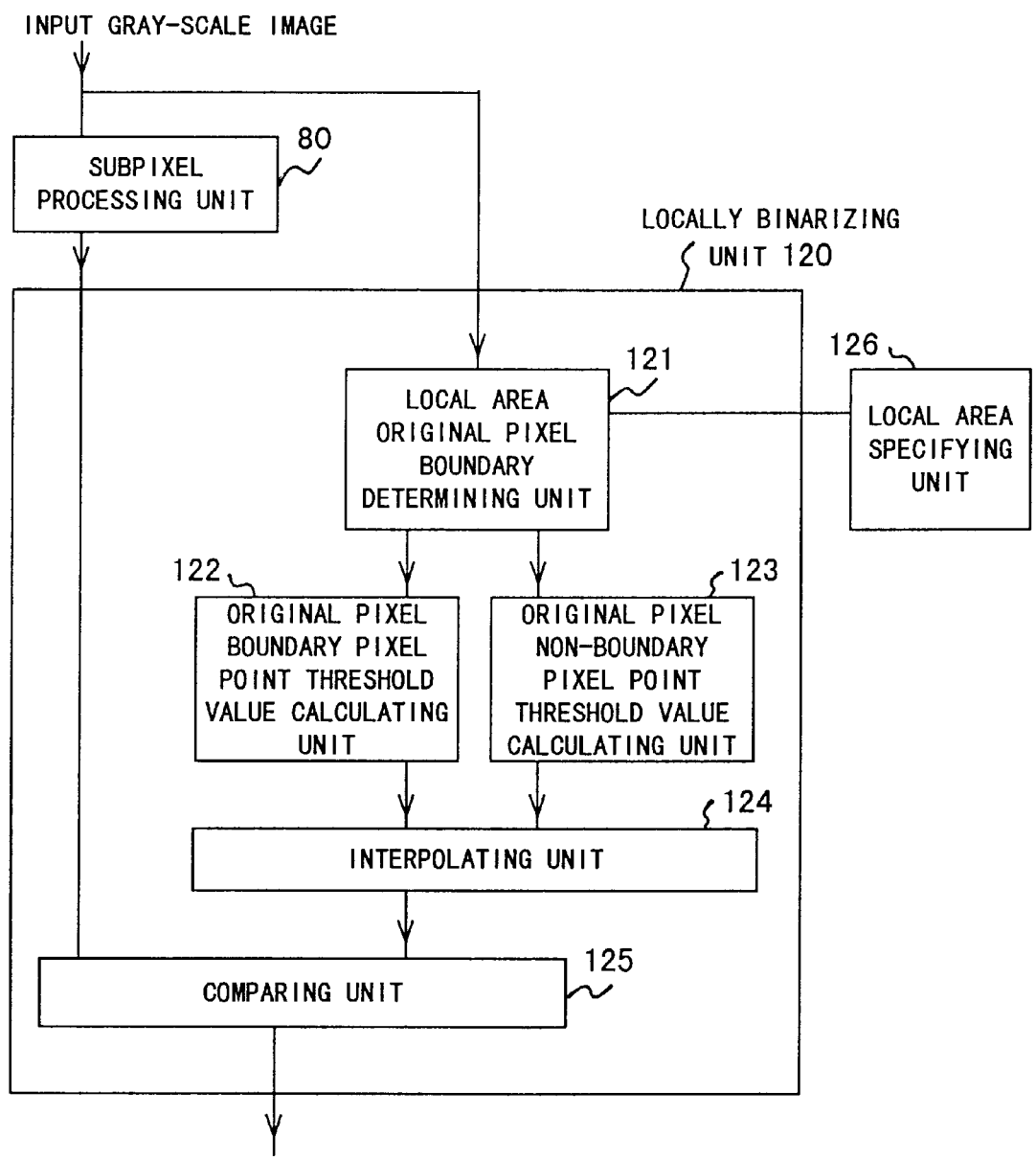
F I G. 1 3

DEVICE, METHOD AND STORAGE MEDIUM FOR RECOGNIZING A DOCUMENT IMAGE

BACKGROUND OF THE INVENTION

1. Field of the Invention

The present invention relates to an image recognizing device.

2. Description of the Related Art

With the popularization of personal computers and the arrangements of networks, the number of electronic documents has been growing in recent years. However, the main medium of information distribution is still a paper document, and an enormous number of paper documents currently exist. Accordingly, a document image recognizing device intended to convert a paper document into an electronic document, and to edit a conversion result has been increasingly demanded. The document image recognizing device is a device which uses a document image as an input, and performs a coding process by recognizing characters, etc. included in the document image. Currently, there are products which use a binary document image as an input. The binary document image is a document image where image data of a character is represented, for example, by "1", while the image data of the background is represented by "0".

Recently, an image filing device has become popular, and also the demand for inputting an image filed by the image filing device to a document image recognizing device, and for recognizing the image has been increasing. Especially, the number of gray-scale or color documents including photographs has been growing. Therefore, the demand for recognizing not only binary documents but also gray-scale or color documents has been on the rise.

A color document image recognizing device recognizes also a color or gray-scale document image. A conventional color document image recognizing device obtains a binary image by binarizing each brightness component with a predetermined threshold value, and recognizes the obtained binary image, if an input document image is not a binary image but a gray-scale or color image.

FIGS. 1A and 1B respectively show the configuration of the conventional color document image recognizing device and an extended color text image.

In FIG. 1A, a document image inputting unit 170 is a unit for inputting a document image, and is typically implemented as a scanner, etc. For a color document, parameters such as a color parameter, a brightness parameter, etc. are assigned to respective pixels by illuminating the document, receiving a reflected light, and analyzing the received light. If the document to be scanned is a gray-scale document, the light reflected from the document is analyzed, the information about the level of brightness is obtained, and this information is assigned to each pixel. At this time, all of the pixels of the gray-scale document are detected to be black-and-white, which is set as the color parameters of each of the pixels.

If an input image is a color image, a brightness image extracting unit 171 extracts a brightness component for each pixel, and outputs a brightness image which is a gray-scale image to a predetermined threshold value binarizing unit. If the input image is a gray-scale image, the color parameters of all of the pixels are set to be black-and-white. Therefore, the gray-scale image resultant from the process of the brightness image extracting unit 171 will become the image data having the same brightness data as that of the input gray-scale image, in principle. This is because only the parameters related to the hue are removed from all the color parameters of the processed gray-scale image.

If a gray-scale image which is a brightness image is input, a predetermined threshold value binarizing unit 172 obtains a binary image by binarizing the gray-scale image with a predetermined threshold value. This threshold value is a value which is externally determined and input. Hereinafter, a gray-scale image fundamentally indicates not the gray-scale image with color parameters set to black-and-white, which is scanned by the document image inputting unit 170, but the brightness image resultant from the process performed by the brightness image extracting unit 171. That is, the gray-scale image is defined to have not color but brightness parameters. Even if the gray-scale image has color parameters, only brightness parameters are substantially valid for recognizing the image if the color parameters are set to black-and-white for all of the pixels. Accordingly, image recognition can be made also by using such a gray-scale image.

A binary image recognizing unit 173 recognizes a binary image. That is, this unit recognizes characters by obtaining the features of the document image which is binarized by the predetermined threshold value binarizing unit 172, and replaces the characters with the codes which are internally used by a computer and correspond to the recognized characters.

A recognition result outputting unit 174 outputs the result of the character recognition made by the binary image recognizing unit 173, that is, the file which is restructured into a code sequence representing the characters of a document image.

The conventional color document image recognizing device has a disadvantage that recognition accuracy is low.

Since the amount of data of each pixel of a color document image is 8 times that of a binary image, the color document image is input to a color document image recognizing device at a resolution lower than that of the binary image in order to reduce an amount of processing time of an image input device such as a scanner, etc., and a capacity of a memory used for filing an image, etc.

FIG. 1B illustrates an expanded low-resolution color text image.

This figure shows a monochromatic image of a 150-dpi text image in full color. With a color display, many colors can be identified on the periphery of the characters, and it seems difficult to identify an area by extracting the same color.

The conventional document image recognizing device is fundamentally designed to have an input of a binary image with a small amount of data, and assumes the document image of a standard resolution of approximately 400 dpi. Accordingly, if a color document image of 150 or less dpi is input, the conventional device converts the document image into a binary image with the resolution equal to or less than 150 dpi, and recognizes the converted image. Therefore, the device cannot recognize the image with sufficient accuracy.

SUMMARY OF THE INVENTION

An object of the present invention is to provide a high-speed document image recognizing device which implements high recognition accuracy.

An image recognizing device according to the present invention comprises: an image converting unit for converting an input document image into a gray-scale image if the input document image is a color image, and for newly outputting a gray-scale image if the input document image is a gray-scale image; a variable resolution binarizing unit for converting the gray-scale image into a binary image with a higher resolution according to the resolution of the gray-scale image; and a unit for recognizing the binarized image.

An image recognizing method according to the present invention comprises the steps of: (a) converting an input document image into a gray-scale image if the input document image is a color image, and for newly outputting a gray-scale image if the input document image is a gray-scale image; (b) converting the gray-scale image into a binary image with a higher resolution according to the resolution of the gray-scale image; and (c) recognizing the binarized image.

According to the present invention, a gray-scale image obtained by converting a color document image or an input gray-scale image is converted into the image data having a suitably higher resolution according to the resolution of the gray-scale image, thereby binarizing the image without losing the information about brightness levels of a gray scale. Therefore, characters appearing in a binary image can be prevented from being defaced, thereby implementing character recognition with higher accuracy.

Furthermore, a drawing area including characters, etc. is roughly extracted from a document image, and a binarization process according to the present invention is performed only for the extracted area, thereby improving the processing speed.

BRIEF DESCRIPTION OF THE DRAWINGS

FIG. 2 is a block diagram showing the principle of a color document image recognizing device according to a preferred embodiment;

FIG. 5 exemplifies the table for specifying the number and the resolution of subpixels to be generated according to the resolution of an input gray-scale image;

FIG. 9 exemplifies the details of a first configuration of a locally binarizing unit;

FIG. 10 exemplifies the details of a second configuration of the locally binarizing unit;

FIG. 11 exemplifies a third configuration of the locally binarizing unit;

FIG. 12 exemplifies a fourth configuration of the locally binarizing unit;

FIG. 13 exemplifies a fifth configuration of the locally binarizing unit;

DESCRIPTION OF THE PREFERRED EMBODIMENTS

Figure 1A:
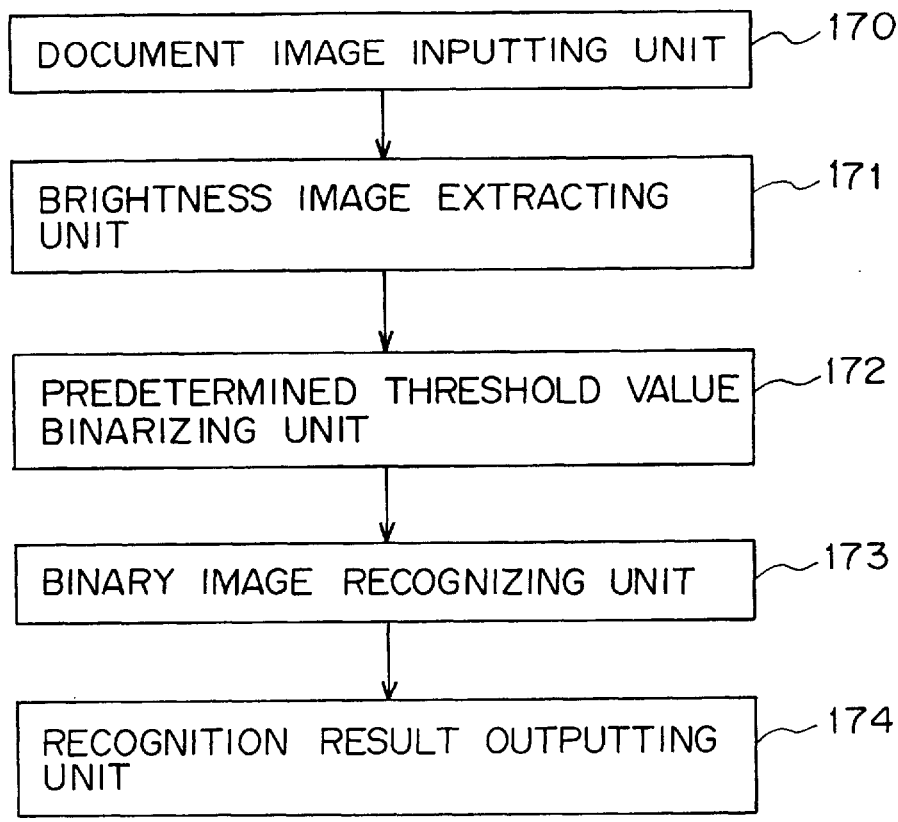
FIG. 1A shows the configuration of a conventional color document image recognizing device.
Figure 1B:
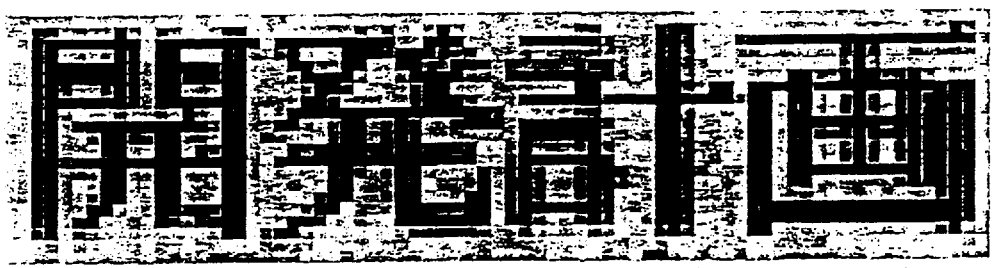
FIG. 1B shows an expanded color text image.

According to the present invention, an input image is converted into a binary image with a higher resolution according to the resolution of the input image in order to overcome the above described problems of the conventional device.

Even if the resolution of an input image is low, a human being can recognize the image if it is a color or gray-scale image. However, even a human being has difficulty in recognizing an image which is binarized by the conventional device. This is because the information about the brightness components of the original image is lost. To facilitate the recognition of the binarized image, the information about the brightness components of the image must be reflected in the binarized image. For the implementation of the reflection, it is effective to increase the resolution of the binarized image.

If an input document image is a color image, it is converted into a gray-scale image and further converted into a binary image with the resolution according to that of the input image. The converted binary image is recognized and the characters are converted into electronic codes.

As a specific means for converting a gray-scale image into a binary image having the resolution according to that of an input image, a method for obtaining a binary image after performing the subpixel generation process which increases the number of pixels included in a gray-scale image by interpolating the values of the pixels included in the gray-scale image, is considered. As a specific method of the subpixel generation process, a linear interpolation method between pixel values can be cited.

Additionally, the method for extracting a character portion and its periphery from an entire image, for suitably generating a threshold value within the extracted partial image, and for performing character recognition, can be cited as a method for improving the recognition ratio of a color or gray-scale image. With this method, the result of the binarization process allows a character to be clearly shaped by reducing the light and shade of an area having a higher level of brightness in the background, that is, noise components rather than by preventing the information of brightness components from being lost.

FIG. 2 is a block diagram showing the principle of a color document image recognizing device according to a preferred embodiment.

A document image inputting unit 10 is a unit corresponding to a scanner in a similar manner as in the above described conventional technique, and is intended to illuminate a color or gray-scale document (including parameters related to hue), and to capture the document as an image.

A brightness image extracting unit 11 is a unit for extracting only brightness components from the image input by the document image inputting unit 10, and for generating a gray-scale image (which does not include parameters related to hue). The gray-scale image which is the output of the brightness image extracting unit 11 is input to a variable resolution binarizing unit 12 to be described next.

The variable resolution binarizing unit 12 (roughly) extracts a partial area including characters from the input gray-scale image having a low resolution, and provides a binary image where characters are easily recognized to a binary image recognizing unit 13 at a succeeding stage by generating subpixels between original pixels within the gray-scale image and interpolating the information about brightness components.

The binary image recognizing unit 13 performs character recognition based on the binary image passed from the variable resolution binarizing unit 12, and performs the process for replacing characters of an image with electronic codes.

A recognition result outputting unit 14 receives the document file as an electronic code sequence from the binary image recognizing unit 13, stores the document file onto a storage medium such as a hard disk, etc., and outputs the document file as a recognition result to a display monitor.

Since the configurations of the document image inputting unit 10, the brightness image extracting unit 11, the binary image recognizing unit 13, and the recognition result outputting unit 14 are similar to those of the conventional technique, their detailed explanations are omitted here. That is, even if they are omitted, a skilled artisan can easily understand the configurations of the document image inputting unit 10, the binary image recognizing unit 13, and the recognition result outputting unit 14, and can actually use them in a current situation where devices and software for recognizing a black-and-white document are commercialized. Additionally, the skilled artisan can easily understand also the configuration of the brightness image extracting unit 11, because this unit is intended to convert a color image, etc. into a gray-scale image, and, at present, a color image is converted into a black-and-white image and telecast. Therefore, its explanation is omitted here.

Accordingly, the present invention is characterized in that a predetermined threshold value binarizing unit 172 is replaced with a variable resolution binarizing unit 12. The explanation to be provided below will refer to the details of the variable resolution binarizing unit 12. The variable resolution binarizing unit 12 converts a gray-scale image into the binary image having the resolution according to that of an input image, or binarizes a gray-scale image after roughly extracting a portion including characters from a gray-scale image, so that the image can be used for character recognition. Additionally, the resolution conversion and the rough extraction may be performed at the same time.

Figure 3A:
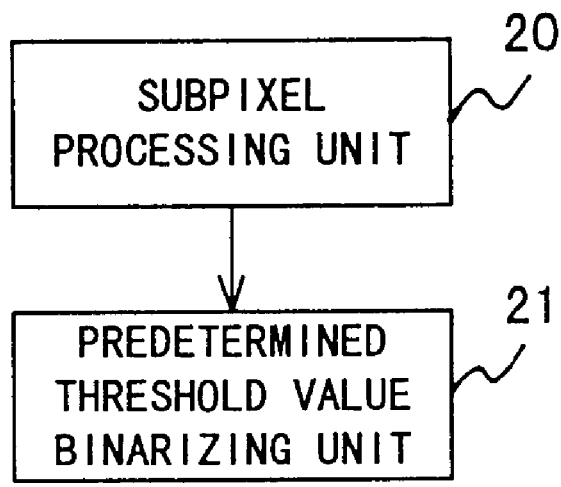
FIGS. 3A and 3B exemplify the configurations of a variable resolution binarizing unit.
Figure 3B:
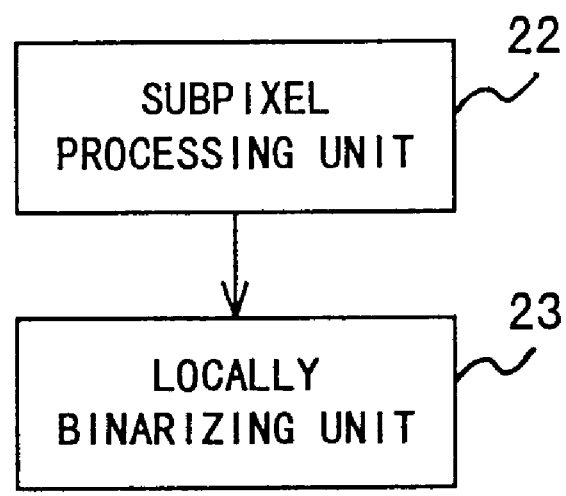

FIGS. 3A and 3B are block diagrams exemplifying the configurations of the variable resolution binarizing unit.

As a first example of the configuration of the variable resolution binarizing unit, subpixels are generated between original pixels of a gray-scale image by a subpixel processing unit 20, the resolution is increased according to the resolution of the gray-scale image which is an input image, and then the conventional process for binarizing an image with a predetermined threshold value is performed by a predetermined threshold value binarizing unit 21, as shown in FIG. 3A.

Here, a predetermined threshold value is defined to be used for a single document image. For example, only one threshold value is used for binarizing a 1-page document image.

The process for generating subpixels is a process for subdividing the space between original pixels of a gray-scale image whose recognition ratio is not likely to be improved if it is binarized unchanged, and for generating virtual pixel data in the original data. Although its details will be described later, in short, the pixel value (the level of brightness) of a subpixel is obtained by interpolating the levels of brightness of original pixels of an input gray-scale image. Typical of the interpolation method is a linear interpolation method.

As a second example of the configuration of the variable resolution binarizing unit, a locally binarizing unit 23 shown in FIG. 3B may be arranged instead of the predetermined threshold value binarizing unit 21 shown in FIG. 3A, as illustrated in FIG. 3B. The locally binarizing unit 23 sets the local area where the process is to be performed for each pixel included in a drawing area within an entire gray-scale document image, and obtains a binary image by binarizing the image with the threshold value generated by using the pixel data within the local area.

That is, the threshold value of the level of brightness is obtained in a local range (local area such as a regular square area centering around a target pixel), and the binarization process is performed. That is, the binarization process is performed so that the pixel with the level of brightness which is equal to or lower than the threshold value is black (the level of brightness is set to, for example, "1"), and the pixel with the level of brightness which is equal to or higher than the threshold value is white (the level of brightness is set to, for example, "0"). The threshold value of a local area is defined, for example, with the method using the linear combination of an average pixel value, a standard deviation value, and a variance. The threshold value is defined, for example, as follows. In the following equation, a local binarization parameter is a constant, and an optimum threshold value is obtained by suitably setting this parameter. Note that the gray scale is used almost similar to the brightness in the following equation.

(threshold value)=(average gray scale)+(local binarization parameter)×(gray-scale standard deviation value)

Figure 4:
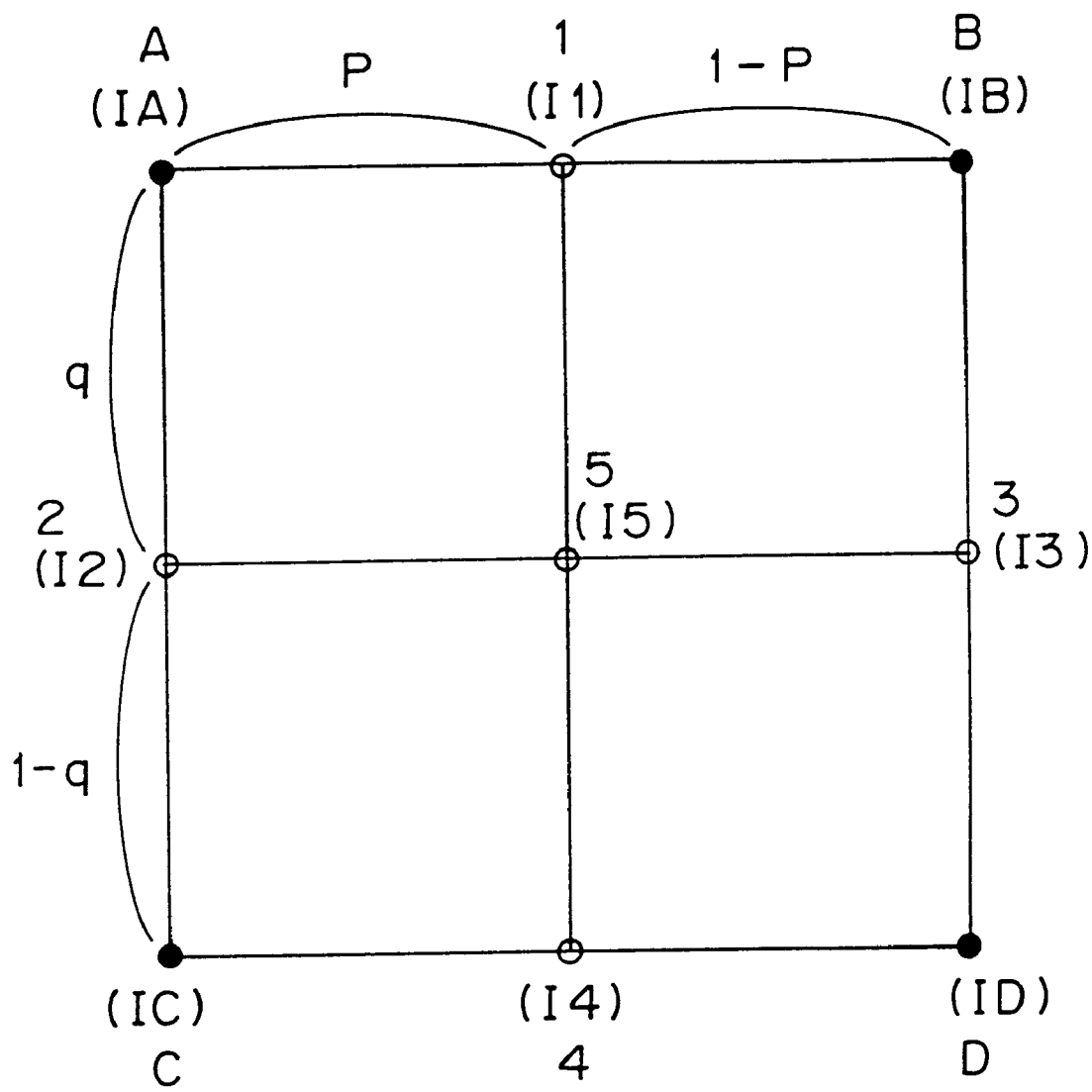
FIG. 4 is a schematic diagram explaining the principle of the process for generating subpixels.

FIG. 4 is a schematic diagram explaining the principle of the process for generating subpixels.

In this figure, black circles indicate original pixels of a gray-scale image, while white circles indicate subpixels. Additionally, IA through ID indicate the levels of the gray scale of the original pixels A through D. Furthermore, I1 through I5 indicate the levels of gray scale of the subpixels 1 through 5 to be obtained from the levels of gray scale of the original pixels with the interpolation process.

As shown in this figure, if subpixels are generated with the linear interpolation within an area enclosed by the four original pixels, it is first determined how many subpixels will be arranged between the original pixels. Next, subpixels are positioned at regular intervals according to the number of subpixels to be arranged. Then, the levels of gray scale are assigned to the respective subpixels by interpolating the levels of gray scale of the original pixels.

Considered below is the case where the subpixels are arranged in the area enclosed by the original pixels A through D based on the assumption that "p" and "q" are numbers which are larger than "0" and smaller than "1". A subpixel 1 is arranged at the position represented by "p:1−p" in a straight line AB linking the original pixels A and B. In this case, the levels of gray scale of the subpixel 1 is obtained from the levels of gray scales IA and IB of the original pixels A and B with the linear interpolation according to the following equation.

$$I1=p*IB+(1-p)*IA$$

Similarly, the levels of gray scales of the subpixels 2 through 4 are obtained as follows.

$$I2=q*IC+(1-q)*IA$$

$$I3=q*ID+(1-q)*IB$$

$$I4=p*ID+(1-p)*IC$$

Additionally, the level of gray scale I5 of the subpixel 5 included in the area enclosed by the original pixels A through D can be obtained according to the following equation.

$$I5=p*q*ID+p*(1-q)*IB+q*(1-p)*IC+(1-p)*(1-q)*IA$$

The above described calculation is made for all of the subpixels arranged between the original pixels, so that the process for generating subpixels is completed. The obtained levels of gray scale are stored with a method similar to that of original pixel data, along with the corresponding positions of the subpixels.

FIG. 5 exemplifies a table for specifying the number of subpixels to be generated, according to the resolution of a gray-scale image which is an input image.

The process for generating subpixels between original pixels must be performed at the beginning of the calculation process explained by referring to FIG. 4. Although the number of subpixels to be generated is arbitrary, it must be set so that sufficient character recognition accuracy can be obtained from the image for which subpixels are generated and which is binarized. Accordingly, there is no equation for uniquely determining the number of subpixels to be generated according to the resolution of an input image. The number of subpixels to be generated must be determined based on experimental data to some extent.

In FIG. 5, the resolution of an input image is stored in the left column in correspondence with a subpixel generation parameter in the right column. For example, if the resolution of an input image is 100 dpi, subpixels are generated to form a grid of 6×6 for each original pixel. If the resolution of an input image is 150 dpi, subpixels are generated in order to form a grid of 3×3 for each original pixel.

In this way, the above described subpixel processing unit stores the table shown in FIG. 5. When a gray-scale image is input, the subpixel processing unit obtains the number of subpixels to be generated according to the resolution of the input image, and determines the positions of the subpixels. Next, the subpixel processing unit obtains the levels of gray scale of the respective subpixels from the levels of gray scale of the original pixels with the interpolation process by using the calculation method explained by referring to FIG. 4, and generates the image data having a high resolution according to the resolution of the input image.

Figure 6:
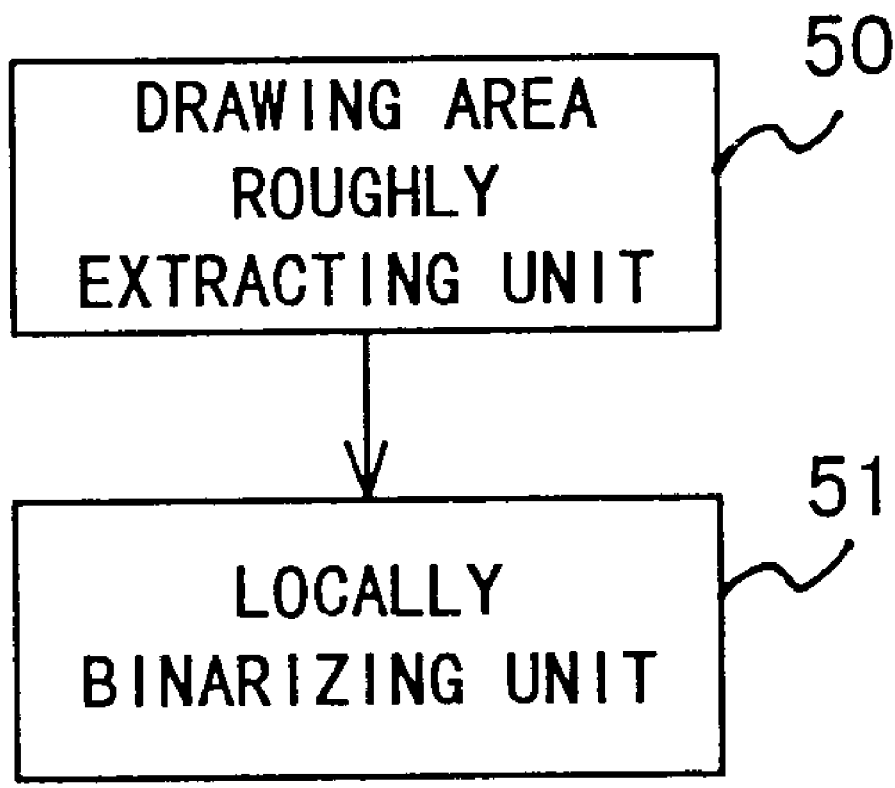
FIG. 6 exemplifies an additional configuration of the variable resolution binarizing unit.

FIG. 6 is a block diagram exemplifying a further configuration of the variable resolution binarizing unit.

The configuration shown in FIG. 3B relatively requires a considerable amount of time in order to locally binarize an entire image area. In the meantime, with the configuration shown in FIG. 6, a drawing area roughly extracting unit may perform the global process for recognizing as the periphery of characters the image portion whose pixel values are lower than a global threshold value set for the pixel values of a gray-scale image, and for roughly extracting the drawing area. Then, a local binarization process may be performed.

That is, the drawing area roughly extracting unit 50 extracts the portion including characters and its periphery from a document image, and the locally binarizing unit binarizes the gray-scale image within the extracted area. The rough extraction is performed by totaling the number of pixels having one level of gray scale or brightness of all of the pixels of a document image, as will be described later. If the number of pixels is large in a portion where the level of brightness is high, it indicates the background of a document image. If the number of pixels is large in a portion where the level of brightness is low, it indicates the portion including a character of the document image. A threshold value is set to a value in the portion where the number of pixels is small, which corresponds to the middle of the two peaks. This threshold value setting is similar to that of the binarization process. Note that, however, the position at which the threshold value is set is slightly shifted to a higher level of brightness. If the pixels included in a document image are extracted with such a threshold value (global threshold value), the extracted portion will include a character and its periphery. The locally binarizing unit 51 binarizes the image with another threshold value for the roughly extracted area, so that noise components caused by the light and shade of the background of the document image can be removed. Consequently, the binary image which is easier to be recognized can be obtained.

Specifically, the global threshold value is determined with the linear sum of an average pixel value, a standard deviation value, and a variance. Or, it can be determined as follows. A global process parameter which will appear in the following equation is a constant.

(global threshold value)=(an average of all pixel values)+(global process parameter)×(standard deviation value of all pixel values)

The position of the global threshold value is adjusted to the position where the rough extraction can be most effectively made by making an adjustment with the global process parameter.

Figure 7:
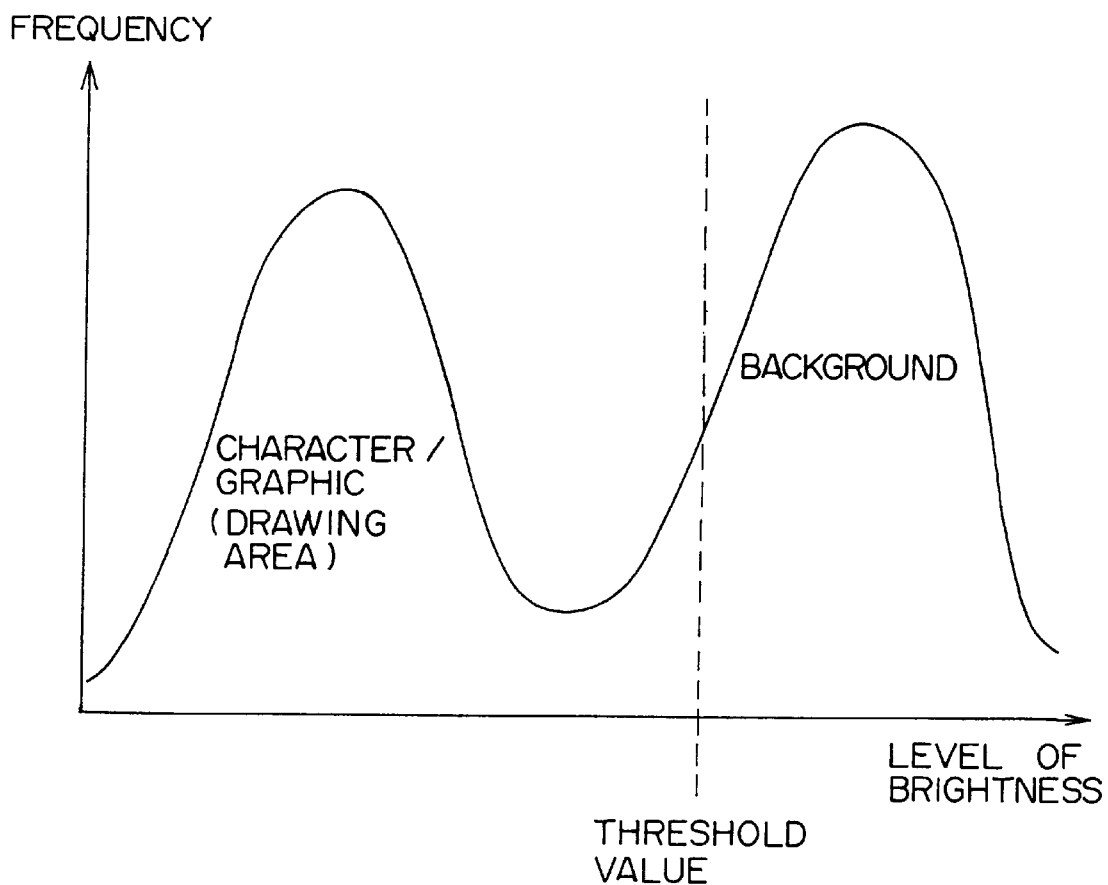
FIG. 7 is a schematic diagram explaining the method for setting a global threshold value used for a rough extraction process.

FIG. 7 is a schematic diagram explaining how to set a global threshold value used for the rough extraction process.

When the rough extraction process is performed, as shown in this figure, the levels of brightness are obtained from all of the pixels structuring an entire document image, and the statistics of the frequency at which a pixel having a particular level of brightness appears in the document is collected in a similar manner as in the case where the predetermined threshold value is determined for the entire document image. In this figure, the appearance frequency of the pixel against the level of brightness forms a gentle curve. However, this is illustrated for ease of explanation about the threshold value setting method. If the statistical process representing the frequency at which a pixel having a certain level of brightness appears is actually performed with a device, the result will be a histogram.

In FIG. 7, frequency peaks are formed in the respective portions where the levels of brightness are low and high. The portion where the level of brightness is high is the background of a document image, and this level of brightness is the level of brightness of the paper on which the document is created. In the meantime, the portion where the level of brightness is low is an area where a character or a graphic, etc. is drawn. If the frequencies at which pixels appear are classified depending on the levels of brightness, the pixels are grouped into two major groups such as the pixels included in the drawing area and the pixels included in a background. Therefore, the rough extraction process can be performed by setting the threshold value of the level of brightness to almost the middle of the two peaks, and extracting the pixels having the levels of brightness which are lower than this threshold value from the document image.

If a document is structured by the reverse video of a black-and-white image, the area where the two peaks are drawn and the background become reversed. Accordingly, the pixels having levels of brightness which are higher than a preset threshold value, are output as a drawing area.

If an entire document is binarized with a predetermined threshold value, the threshold value is set to a value corresponding to almost the middle of the two peaks, that is, the value at the bottom of the frequency curves. This is because the character recognition cannot be made with high accuracy if the pixels of the background are also captured. When the rough extraction process is performed, however, an extracted area which includes the periphery of a character is more convenient to set a threshold value in the binarization process. Therefore, the threshold value is set to the value which is slightly shifted from the bottom toward the peak of the background. In this way, the area where a character, etc. is drawn and its periphery are extracted.

Figure 8A:
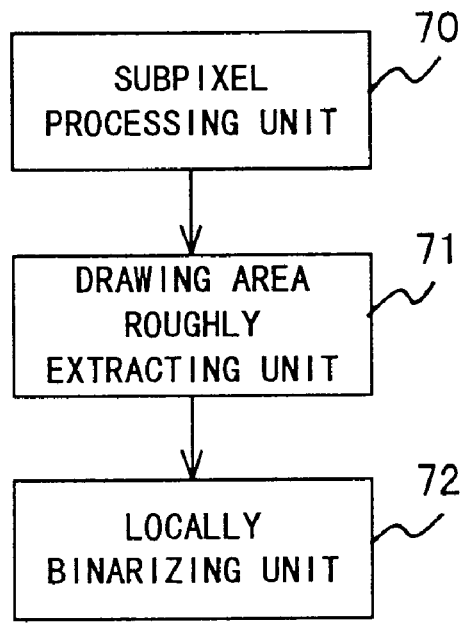
FIGS. 8A and 8B exemplify the further configurations of the variable resolution binarizing unit.
Figure 8B:
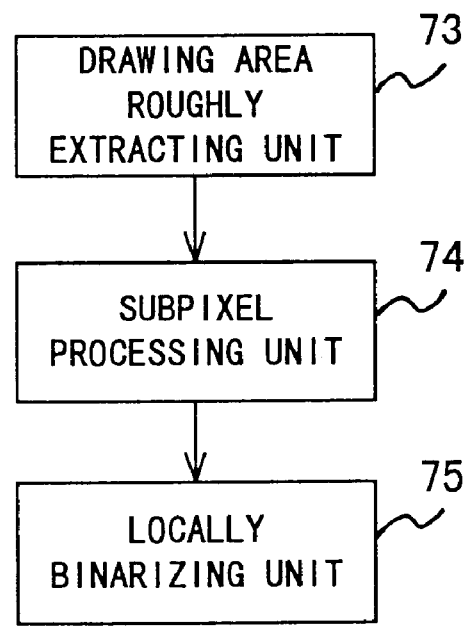

FIGS. 8A and 8B are block diagrams exemplifying further configurations of the variable resolution binarizing unit.

If the configurations shown in FIGS. 3A and 6 are combined, the global process for roughly extracting a drawing area is performed after the subpixel generation process is performed for a gray-scale image. Then, the local binarization process is performed for each of the pixels included in the drawing area. As a result, the processes can be performed at a higher speed than that implemented by the configuration shown in FIG. 3A, and at the same time, the recognition accuracy is improved more than that available from the configuration shown in FIG. 6.

With the configuration shown in FIG. 8A, the subpixel generation process is initially performed by a subpixel processing unit 70, and then a document image is roughly extracted by a drawing area roughly extracting unit 71. With the subpixel generation process, the information about the level of brightness of a gray-scale image can be prevented from being lost, or rather, the information about the level of brightness is included. As a result, the accuracy of the binarization process can be improved. Furthermore, performing the rough extraction process eliminates the need to target the whole of a document image, thereby reducing the number of pixels to be processed and improving the processing speed of the locally binarizing unit.

The subpixel processing unit 70 performs the subpixel generation process for the whole of a document image. The drawing area roughly extracting unit 71 performs the rough extraction process by also targeting subpixels. Accordingly, the processing speed and the accuracy can be improved further than that implemented in the case where only the rough extraction process is performed. However, the subpixel generation process must be performed for the whole of the document image in this case. Therefore, the amounts of data handled by the subpixel processing unit 70 and the drawing area roughly extracting unit 71 increase, which leads to the slowdown of the processing speed and the insufficiency of the capacity of a memory storing data, although the processing speed of the locally binarizing unit 72 can be improved.

FIG. 8B is a block diagram exemplifying the configuration which improves the processing speed implemented by the configuration shown in FIG. 8A.

The configuration shown in FIG. 8B is obtained by reversing the processing order of the subpixel processing unit 70 and the drawing area roughly extracting unit 71, which are included in the configuration shown in FIG. 8A. Because the process of the drawing area roughly extracting unit 73 is performed for the original gray-scale image whose number of pixels is not increased with the subpixel generation process, the amount of data handled by the drawing area roughly extracting unit 73 is reduced and the processing speed is made faster.

Additionally, it is sufficient for the subpixel processing unit 74 to also perform the subpixel generation process, not for the whole of an input gray-scale image, but only for the area extracted by the drawing area roughly extracting unit 73. Accordingly, the number of pixels to be handled is reduced much more than that in the case where the subpixel generation process is performed for the whole of the input gray-scale image, in the configuration shown in FIG. 8A. Consequently, the capacity of the memory storing data can be decreased, and at the same time, the processing speed can be improved.

Furthermore, since the amount of throughput of the locally binarizing unit 75 is approximately the same as that of the corresponding unit shown in FIG. 8A, the processing speed on the whole can be improved, and also the amount of required hardware resources such as a memory, etc. can be reduced.

Generally, with the configurations (shown in FIGS. 3A, 8A, and 8B) for performing the local binarization process after the subpixel generation process, the threshold value of the local binarization process is calculated from the subpixel value at the interpolation point (subpixel). However, the subpixel value at the interpolation point is obtained from the original pixel values, the local binarization process can be performed according to the equation obtained by assigning the equation for obtaining a subpixel value at an interpolation point from original pixel values, to the equation for obtaining a local threshold value from the subpixel value at the interpolation point.

FIG. 9 is a block diagram exemplifying the details of the configuration of the locally binarizing unit.

Because the contents of the subpixel generation process performed by a subpixel processing unit 80 are the same as those explained by referring to FIG. 4, the explanation is omitted here. A locally binarizing unit 81 is composed of a threshold value calculating unit 82 and a comparing unit 83. The threshold value calculating unit 82 directly obtains the threshold value of the local binarization process from a gray-scale image. The comparing unit 83 makes a comparison between the threshold value and the value at the point where a subpixel is generated, which is obtained by the subpixel processing unit 80, and outputs the result of the binarization process.

That is, the information about a pixel point of an input gray-scale image is directly input to the threshold value calculating unit 82. Furthermore, the threshold value calculating unit 82 sets a local area by targeting a particular pixel point, statistically classifies the level of gray scale (the level of brightness) at each pixel point within the local area as explained by referring to FIG. 7, and sets a threshold value which allows the distinction between the pixel having the level of brightness which represents a background, and the pixel having the level of brightness which represents a drawing area, to be made as definite as possible. The rough extraction process is explained by referring to FIG. 7, and the threshold value which is shifted to the level of brightness, which represents a background, is described to be used. If the binarization process is performed, the threshold value is set to the value corresponding to the bottom of the frequency curves shown in the middle of FIG. 7. With such a threshold value setting, the distinction between the pixel structuring a character and the pixel structuring a background can be definitely made. As a result, a binary image which is easier to be recognized can be obtained.

The threshold value calculated by the threshold value calculating unit 82 is input to the comparing unit 83. The subpixel processing unit 80 generates the information about each pixel point of the gray-scale image for which the subpixel generation process is performed, and about the level of brightness at each pixel point, and inputs to the comparing unit 83 the information about the level of brightness of the pixel point targeted by the threshold value calculating unit 82. The comparing unit 83 then makes a comparison between the level of brightness at each pixel point and the threshold value. Here, assume that the level of brightness at a pixel point, which is higher than the threshold value, is set to "0", while the level of brightness at the pixel point, which is lower than the threshold value, is set to "1". The pixel point to be targeted is sequentially changed, and the above described process is repeatedly performed, so that a binary image corresponding to the input gray-scale image can be obtained. The pixel point referred to in the above explanation includes both an original pixel of an input gray-scale image and a subpixel generated by performing the subpixel generation process. If the pixel point is used to indicate an original pixel of an input gray-scale image, it is hereinafter referred to as an original pixel point. With the configuration shown in FIG. 9, the binarization process is performed for the whole of image data whose number of pixels is increased by performing the subpixel generation process for the whole of the input gray-scale image.

FIG. 10 shows the details of the second configuration of the locally binarizing unit.

In this figure, the local threshold value after the subpixel generation process is obtained only at each original pixel point of a gray-scale image. The local threshold value at an interpolation point (a subpixel point) is obtained by interpolating the local threshold values at the original pixel points of the gray-scale image. Namely, with the configuration shown in FIG. 9, both subpixel points and original pixel points of a gray-scale image are handled in a similar manner, and the threshold value for the local binarization process is calculated. However, with the configuration shown in FIG. 10, only the threshold value at an original pixel point is calculated, and the threshold value at a subpixel point is obtained with the interpolation process. Actually, the interpolation process explained by referring to FIG. 4 is not performed for the level of brightness at each original pixel point. The threshold value at a subpixel point is obtained by interpolating threshold values obtained at original pixel points, similar to the level of brightness.

That is, a pixel point threshold value calculating unit 91 obtains the local threshold value after the subpixel generation process only at an original point of a gray-scale image. An interpolating unit 92 obtains the local threshold value at an interpolation point (subpixel) by interpolating the local threshold values at the pixel points of the gray-scale image. The comparing unit 83 makes a comparison between the pixel value at a pixel point, which is obtained by the subpixel processing unit 80, and the threshold value obtained by the interpolating unit 92, and outputs the result of the binarization process. Such a binarizing process is performed for all of the pixel points obtained by the subpixel processing unit 80, thereby obtaining a binary image.

The method for obtaining the local threshold value at an original pixel point of a gray-scale image, which is executed by the pixel point threshold value calculating unit 91, includes the following methods.

(1) Obtaining the local threshold value at an original pixel point of a gray-scale image by using the value of the subpixel obtained by interpolating original pixel points of the gray-scale image.

(2) Obtaining the local threshold value by substituting the equation for obtaining the subpixel value at the interpolation points from the original pixel values into the equation for obtaining the local threshold value from the subpixel value at the interpolation points.

(3) Obtaining the subpixel value from the linear combination of an average value, a standard deviation value, and a variance, by obtaining the standard deviation value and the variance after obtaining the average value and a square average value of values at pixel points of the gray-scale image, for which the subpixel generation process is performed, from an equation obtained by substituting an equation for obtaining a subpixel value from original pixel values, to an equation for obtaining the average value and the square average value from subpixel values.

The configuration implementing the method (1) is shown in FIG. 10.

The configuration implementing the method (2) is shown in FIG. 11. The pixel point threshold value calculating unit uses only the pixel values of a gray-scale image.

The method (3) is applicable if the local threshold value is the linear combination of an average pixel value, a standard deviation value, and a variance within a local area. The configuration implementing the method (3) is shown in FIG. 12. The variance is obtained from the average pixel value and the square average value. The standard deviation value is obtained from the variance. The specific example of the equation will be provided next.

variance=an average of square values−the square of an average value standard deviation=√(variance)

If the local area recognizes original pixels as its boundary, the equations for obtaining the local threshold value and the average values are simplified, which leads to a speeding-up of the processing. Therefore, the method using these expressions may be available.

Additionally, the locally binarizing unit may comprise a local area specifying unit, by which the process may be performed by making a distinction between the case where a local area does not recognize original pixels as its boundary, and the case where the local area recognizes the original pixels as its boundary (FIG. 13). The local area specifying unit is a unit for using the number of subpixels generated with the interpolation process and the size of a local area as its specification data, and a local are an original pixel boundary determining unit is a unit for automatically determining whether or not the local area recognizes original pixels as a boundary.

Provided below are the explanations about the configurations shown in FIGS. 11 through 13.

FIG. 11 exemplifies the third configuration of the locally binarizing unit.

The locally binarizing unit 100 is composed of a pixel point threshold calculating unit 101, an interpolating unit 102, and a comparing unit 83.

When a gray-scale image is input, the data of the original pixels of the gray-scale are input to the subpixel processing unit 80 and the pixel point threshold value calculating unit 101. The subpixel processing unit 80 generates a predetermined number of subpixels between the original pixels by performing the above described process. The pixel point threshold value calculating unit 101 obtains the threshold value at an original pixel point only from the values of the original pixels. The threshold value is obtained by generating the data shown in FIG. 7, and using the average value, the variance, etc. The threshold value obtained at each original pixel point is used by an interpolating unit in order to obtain the threshold value of a subpixel with the method such as the linear interpolation method, etc. The comparing unit 83 makes a comparison between the value of an original pixel or the value of a subpixel generated by the subpixel processing unit, and the threshold value at each pixel point, which is obtained by the pixel point threshold value calculating unit 101 and the interpolating unit 102, and binarizes the pixel value. A binary image is obtained by performing such a process for all of the pixel points.

FIG. 12 is a block diagram exemplifying the fourth configuration of the locally binarizing unit.

A locally binarizing unit 110 is composed of a pixel point threshold value calculating unit 111, an interpolating unit 117, and a comparing unit 118. The contents of the process performed by the subpixel processing unit 80 are similar to those described above. The data of an input gray-scale image is input to the subpixel processing unit 80, and the pixel point threshold value calculating unit 111 included in the locally binarizing unit 110. The pixel point threshold value calculating unit 111 obtains the values at the pixel points within the local area centering around a targeted pixel point. The pixel point average value calculating unit 112 calculates an average of the pixel values. A pixel point square average value calculating unit 113 calculates an average of the squares of the pixel values within the local area. The average of the pixel values from the pixel point average value calculating unit 112 and the average of the squares of the pixel values from the pixel point square average value calculating unit 113 are input to a pixel point variance calculating unit 114, which calculates the variance of the distribution of the pixel values. The calculated variance is input to the pixel point standard deviation value calculating unit 15, which obtains the standard deviation value of the distribution of the pixel values.

The average, variance, and standard deviation values of the pixel values are input to a linear combination calculating unit 116, which calculates a threshold value. The expression for calculating a threshold value must be suitably set by a skilled artisan. According to this preferred embodiment, however, the linear combination of the average and standard deviation values is used as described above, and the threshold value is adjusted by multiplying the standard deviation value and a parameter in order to adjust to what degree the standard deviation value is to affect the threshold value to be set.

After the threshold value is obtained for a certain targeted pixel point in this way, this threshold value calculation process is repeatedly performed for the respective original pixel points of an input gray-scale image until the threshold values are obtained for all of the original pixels. These threshold values are transmitted to the interpolating unit 117, which then obtains the threshold values of subpixels by performing the interpolation process. As a result of the above described processes, the threshold values of the original pixels and the subpixels are obtained. The threshold values are compared with the pixel values transmitted from the subpixel processing unit 80 in the comparing unit 118, and the pixel values are then binarized and output.

FIG. 13 is a block diagram exemplifying the fifth configuration of the locally binarizing unit.

In this example, a locally binarizing unit 120 is composed of a local area original pixel boundary determining unit 121, an original pixel boundary pixel point threshold value calculating unit 122, an original pixel non-boundary pixel point threshold value calculating unit 123, an interpolating unit 124, and a comparing unit 125.

The data of an input gray-scale image are input to the subpixel processing unit 80, and the above described process is performed. Then, the data after the subpixel generation process is input to the comparing unit 125.

The data of the input gray-scale image is input also to the local area original pixel boundary determining unit 121 included in the locally binarizing unit 120. A local area specifying unit 126 is an input unit for specifying where to set a local area for a particular original pixel. The specification may be made either manually or automatically. Especially, if the local area is included by the line structuring a character, the local binarization process may be unsuccessfully performed in some cases. It is therefore desirable that the local area includes the portion of the line structuring a character and the portion of a background in a ratio of 1 to 1.

When the range of the local area is set by the local area specifying unit 126 for the target pixel, the local area original pixel boundary determining unit 121 determines whether or not original pixels exist on the boundary of the local area. If the original pixels exist on the boundary of the local area, data is transmitted to the original pixel boundary pixel point threshold value calculating unit 122, which is made to calculate the threshold value for each of the original pixels. If the original pixels do not exist on the boundary of the local area, the data is transmitted to the original pixel non-boundary pixel point threshold value calculating unit 123, which is made to calculate the threshold value for each of the original pixels. The methods for calculating a threshold value, which are executed by the original pixel boundary pixel point threshold value calculating unit 122 and the original pixel non-boundary pixel point threshold value calculating unit 123, will be described later.

Since the threshold values calculated by the original pixel point threshold value calculating unit 122 or the original pixel non-boundary pixel point threshold value calculating unit 123 are intended only for the original pixels, the threshold values are transmitted to the interpolating unit 124, which obtains the threshold value for a subpixel by performing the interpolation process.

The threshold values obtained for the original pixels and the subpixels in this way are transmitted to the comparing unit 125, which makes a comparison between the threshold values and the pixel values transmitted from the subpixel processing unit 80. The pixels are then binarized and output.

Here, the expressions for directly calculating a local average value and a local square average value from original pixel values will be provided. A local variance and a local standard deviation value are obtained with fundamental arithmetic operations by calculating the local average value and the local square average value, and the linear combination of the local variance and the local standard deviation value is used, whereby a threshold value is obtained according to the above described expressions referred to in the explanation of FIGS. 3A and 3B.

Figure 14:
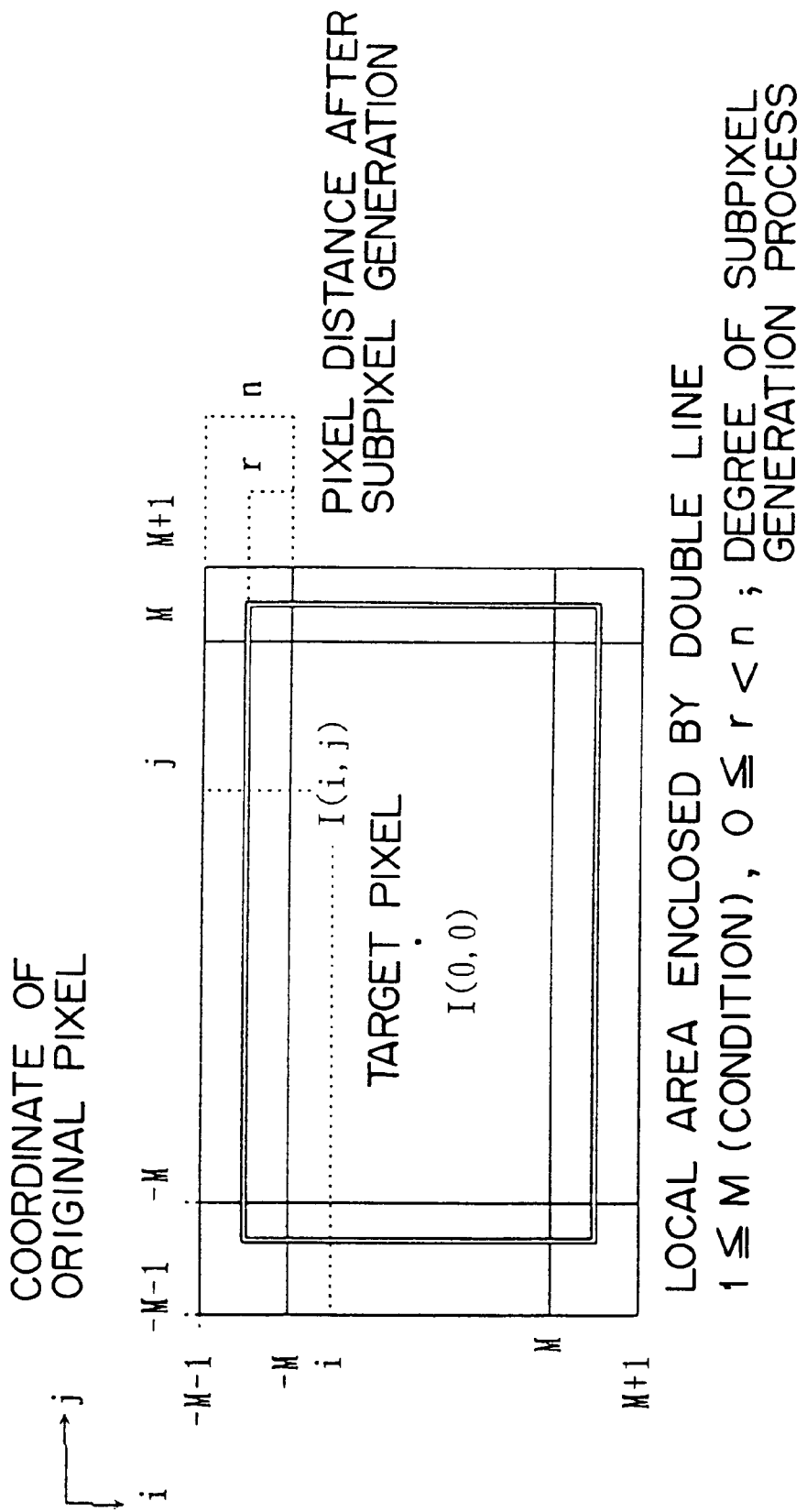
FIG. 14 is a schematic diagram explaining the method for calculating a local average value and a local square average value from original pixel values.

FIG. 14 is a schematic diagram explaining the method for calculating a local average value and a local square average value from original pixel values.

First of all, symbols will be defined. A local area centering around an original pixel is illustrated in FIG. 14. The coordinate of the targeted original pixel is assumed to be (0, 0) for ease of explanation. The description of the coordinate of a normal original pixel is obtained by parallel translating the coordinate. The degree of the subpixel generation is defined to be n($\geq$1), and (n−1) new subpixels are inserted between two original pixels. The local area is a square area centering around a targeted original pixel. The upper left point (that is, the coordinate of the upper left original pixel) of the regular square, which is the original pixel farthest from the targeted original point, among the original pixels included in the local area, is assumed to be (−M, −M) with the condition 1$\leq$M imposed. The number of subpixels, which exist outside the regular square but within the local area in one direction, after the subpixel generation process is assumed to be "r". "r" must satisfy 0$\leq$r<n. The original pixel value at a coordinate (i, j) is represented as I(i, j).

Assuming that one side of the local area is "L", the following equation is satisfied.

$$L = 2(M*n+r)+1 \quad (0 \leq r < n)$$

That is, "M" original pixels center around the targeted pixel point, for example, in a vertical direction, "n−1" subpixels exist between the original pixels, and "r" subpixels exist outside the "M" original pixels. Since the pixels exist in both of the top and the bottom of the local area in a similar manner, 2(M*n+r) is obtained. Additionally, the single target point is added, so that the above described equation is obtained.

"L" is an odd number larger than "2n". Conversely, if "L" which is an odd number larger than a positive number "n", and "2n" are given, "M" and "r" which satisfy the above described equation are uniquely determined. That is, if (L−1)/2 is divided by "n" and its quotient and remainder are obtained, the quotient and the remainder respectively correspond to "M" and "r".

Represented below are the equations for obtaining a local average value and a local square average value, which are respectively used in the case (1) where the boundary of a local area is original pixels (r=0), and in a normal case (2). The expressions used in the case (1) are simpler than those used in the case (2). The expressions are represented as follows.

local average value=$E(I)$ local square average value=$E(I^2)$ $C_i$(i=0, 1, 2, 3, . . . ) is a coefficient which will appear in the following expressions. Even if identical symbols are used, their definitions are different depending on the expressions. Since $E(I)$ and $E(I^2)$ are multiplied by $C_0$ in the following expressions, it is easily understood that the right side of the expressions is divided by $c_o$ in order to obtain $E(I)$ and $E(I^2)$.

(1) In the case where original pixels exist on the boundary of a local area (r=0)

Note that the coefficients are defined by the following equations.

$$C_0 E(I) = C_1 \sum_{i=-M+1}^{M-1} \sum_{j=-M+1}^{M-1} I(i, j) +$$

$$C_2 \sum_{k=-M+1}^{M-1} \{I(-M, k) + I(M, k) + I(k, -M) + I(k, M)\} +$$

$$C_3 \{I(-M, -M) + I(-M, M) + I(M, -M) + I(M, M)\}$$

following equations.

$C_0 = 4(2Mn+1)^2$ $C_1 = 4n^2$ $C_2 = 2n(n+1)$ $C_3 = (n+1)^2$ $$C_0 E(I^2) = \left[ C_1 \sum_{i=-M+1}^{M-1} \sum_{j=-M+1}^{M-1} I(i, j)^2 + C_2 \sum_{k=-M+1}^{M-1} \{I(-M, k)^2 + I(M, k)^2 + I(k, -M)^2 + I(k, M)^2\} + C_3 \{I(-M, -M)^2 + I(-M, M)^2 + I(M, -M)^2 + I(M, M)^2\} \right] +$$

$$\left[ C_4 \sum_{i=-M+1}^{M-1} \sum_{j=-M}^{M-1} I(i, j)I(i, j+1) + C_5 \sum_{j=-M}^{M-1} \{I(-M, j)I(-M, J+1) + I(M, j)I(M, j+1)\} \right] +$$

$$\left[ C_4 \sum_{i=-M}^{M-1} \sum_{j=-M+1}^{M-1} I(i, j)I(i+1, j) + C_5 \sum_{i=-M}^{M-1} \{I(i, -M)I(i+1, -M) + I(i, M)I(i+1, M)\} \right] +$$

$$\left[ C_6 \sum_{i=-M}^{M-1} \sum_{j=-M}^{M-1} \{I(i, j)I(i+1, j+1) + I(i, j+1)I(i+1, j)\} \right]$$

Note that the coefficients are defined by the following equations.

(2) In a normal case $C_0 = 36(2Mn+1)^2 n^2$ $C_1 = 4(2n^2+1)^2$ $C_2 = 2(n+1)(2n+1)(2n^2+1)$ $C_3 = (n+1)^2(2n+1)^2$ $C_4 = 4(n^2-1)(2n^2+1)$ $C_5 = 2(n+1)(n^2-1)(2n+1)$ $C_6 = 2(n^2-1)^2$ $$C_0 E(I) = C_1 \sum_{i=-M+1}^{M-1} \sum_{j=-M+1}^{M-1} I(i, j) + C_2 \sum_{k=-M+1}^{M-1} \{I(-M, k) + I(M, k) + I(k, -M) + I(k, M)\} + C_3 \{I(-M, -M) + I(-M, M) + I(M, -M) + I(M, M)\} +$$

$$C_4 \sum_{k=-M+1}^{M-1} \{I(-M-1, k) + I(M+1, k) + I(k, -M-1) + I(k, M+1)\} + C_5 \{I(-M-1, -M) + I(-M-1, M) + I(M+1, -M) + I(M+1, M) + I(-M, -M-1) + I(-M, M+1) + I(M, -M-1) + I(M, M+1)\} + C_6 \{I(-M-1, -M, -1) + I(-M-1, M+1) + I(M+1, -M-1) + I(M+1, M +$$

Note that the coefficients are defined by the following equations.

$$C_0 = 4(2Mn+1)^2 n^2$$

$$C_1 = 4n^4$$

$$C_2 = 2n^2\{n^2 + (2r+1)n - r(r+1)\}$$

$$C_3 = n^4 + 2(2r+1)n^3 + (2r^2+2r+1)n^2 - 2r(r+1)(2r+1)n + r^2(r+1)$$

$$C_4 = 2r(r+1)n^2$$

$$C_5 = r(r+1)\{n^2 + (2r+1)n - r(r+1)\}$$

$$C_6 = r^2(r+1)^2$$

Note that the coefficients are defined by the following equations.

$$C_0 E(I^2) = \left[ C_1 \sum_{i=-M+1}^{M-1} \sum_{j=-M+1}^{M-1} I(i,j)^2 + C_2 \sum_{k=-M+1}^{M-1} \{I(-M,k)^2 + I(M,k)^2 + I(k,-M)^2 + I(k,M)^2\} + C_3 \{I(-M,-M)^2 + I(-M,M)^2 + I(M,-M)^2 + I(M,M)^2\} + \right.$$

$$C_4 \sum_{k=-M+1}^{M-1} \{I(-M-1,k)^2 + I(M+1,k)^2 + I(k,-M-1)^2 + I(k,M+1)^2\} + C_5\{I(-M-1,-M)^2 + I(-M-1,M)^2 + I(M+1,-M)^2 + I(M+1,M)^2 + I(-M,-M-1)^2 + I(-M,M+1)^2 + I(M,-M-1)^2 + I(M,M+1)^2\} + C_6\{I(-M-1,-M-1)^2 + I(-M-1,M+1)^2 + I(M+1,-M-1)^2 + I(M+1,M+1)^2\}$$

$$\left[ C_7 \sum_{i=-M+1}^{M-1} \sum_{j=-m}^{M-1} I(i,j)I(i,j+1) + \right.$$

$$C_8 \sum_{j=-M}^{M-1} \{I(-M,j)I(-M,j+1) + I(M,j)I(M,j+1)\} +$$

$$C_9 \sum_{j=-M}^{M-1} \{I(-M-1,j)I(-M-1,j+1) + I(M+1,j)I(M+1,j+1)\} +$$

$$C_{10} \sum_{i=-M+1}^{M-1} \{I(i,-M-1)I(j,-M) + I(i,M)I(i,M+1)\} +$$

$$C_{11}\{I(-M,-M-1)I(-M,-M) + I(-M,M)I(-M,M+1) + I(M,-M-1)I(M,-M) + I(M,M)I(M,M+1)\} +$$

$$C_{12}\{I(-M-1,-M-1)I(-M-1,-M) + I(-M-1,M)I(-M-1,M+1) + I(M+1,-M-1)I(M+1,-M) + I(M+1,M)I(M+1,M+1)\} +$$

$$\left[ C_7 \sum_{i=-M+1}^{M-1} \sum_{j=-M+1}^{M-1} I(i,j)I(i+1,j) + \right.$$

$$C_8 \sum_{i=-M}^{M-1} \{I8i,-M)I(i+1,-M) + I(i,M)I(i+1,M)\} +$$

$$C_9 \sum_{j=-M}^{M-1} \{I(i,-M-1)I(i+1,-M-1) + I(i,M+1)I(i+1,M+1)\} +$$

$$C_{10} \sum_{j=-M+1}^{M-1} \{I(-M-1,j)I(-M,j) + I(M,j)I(M+1,j)\} + C_{11}\{I(-M-1,-M)I(-M,-M) + I(M,-M)I(M+1,-M) + I(-M-1,M)I(-M,M) + I(M,M)I(M+1,M)\} +$$

$$C_{12}\{I(-M-1,-M-1)I(-M,-M-1) + I(M,-M-1)I(M+1,-M-1) + I(-M-1,M+1)I(-M,M+1) + I(M,M+1)I(M+1,M+1)\} +$$

$$\left[ C_{13} \sum_{k=-M}^{M-1} \sum_{j=-M}^{M-1} \{I(i,j)I(i+1,j+1) + I(i,j+1)I(i+1,j)\} + \right.$$

$$C_{14} \sum_{k=-M}^{M-1} (\{I(-M-1,k)I(-M,k+1) + I(-M-1,k+1)I(-M,k)\} + \{I(M,k)I(M+1,k+1) + I(M,k+1)I(M+1,k)\} + \{I(k,-M-1)I(k+1,-M) + I(k+1,-M-1)I(k,-M)\} + \{I(k,M)I(k+1,M+1)LI(k+1,M)I(-M,-M-1)\}) +$$

$$C_{15}(\{I(-M-1,-M-1)I(-M,-M) + I(-M-1,-M)I(-M,-M-1)\} + \{I(-M-1,M)I(-M,M+1) + I(-M-1,M+1)I(-M,M)\} + I(M,-M-1)I(M+1,-M) + I(M,-M)I(M+1,-M-1)\} + \{I(M,M)I(M+1,M+1) + I(M,M+1)I(M+1,M)\})$$

The expression which is used in the case where "M" is equal to or larger than "1" is represented for the $$C_0 = 36n^4(2MN+2r+1)^2$$

$$C_1 = 4n^2(2n^2+1)^2$$

$$C_2 = 2n\{4n^5 + 6(2r+1)n^4(-3r^2-3r+1)n^3 + (4r^3+6r^2+8r+3)n^2 + (-6r^2-6r+1)n + r(r+1)(2r+1)\}$$

$$C_3 = 4n^6 + 12(2r+1)n^5 + (12r^2+12r+13)n^4 - 2(32r^3+48r^2+10r-3)n^3 + (60r^4+120r^3+54r^2-6r+1)n^2 - 2r(12r^4+30r^3+22r^2+3r-1)n + r^2(r+1)^2(2r+1)^2$$

$$C_4 = 2r(r+1)(2r+1)n(2n^2+1)$$

$$C_5 = r(r+1)(2r+1)\{2n^3 + 3(2r+1)n^2 + (-6r^2-6r+1)n + r(r+1)(2r1)\}$$

$$C_6 = r^2(r+1)^2(2r+1)^2$$

$$C_7 4n^2(n^2-1)(2n^1+1)$$

$$C_8 2n(n^2-1)\{2n^3 + 3(2r+1)n^2 + (-6r^2-6r+1)n + r(r+1)(2r+1)$$

$$C_9 = 2r(r+1)(2r+1)n(n^2-1)$$

$C_{10}=4r(r+1)n(3n-(2r+1))(2n^2+1)$ $C_{11}=2r(r+1)\{6n^4+7(2r+1)n^3-30r(r+1)n^2+(18r^3+27r^2+7r-1)n-r(4r^3+8r^2+5r+1)\}$ $C_{12}=2r^2(r+1)^2(2r+1)(3n-(2r+1))$ $C_{13}=2n^2(n^2-1)^2$ $C_{14}=2r(r+1)n(n^2-1)(3n-(2r+1))$ $C_{15}=2r^2(r+1)^2(3n-(2r+1))$ normal case (2). The expression which is used in the case where M=0 can be obtained in the following three steps.

(1) Setting "M" to "1".
(2) Replacing "n" with "r".
(3) Replacing the value of "I" with the boundary value of a local area The variance and standard deviation values can be obtained by using the average value and the square average value of the pixel values within a local area, which are obtained with the above described expressions, thereby obtaining the expression for determining a threshold value.

Figure 15:
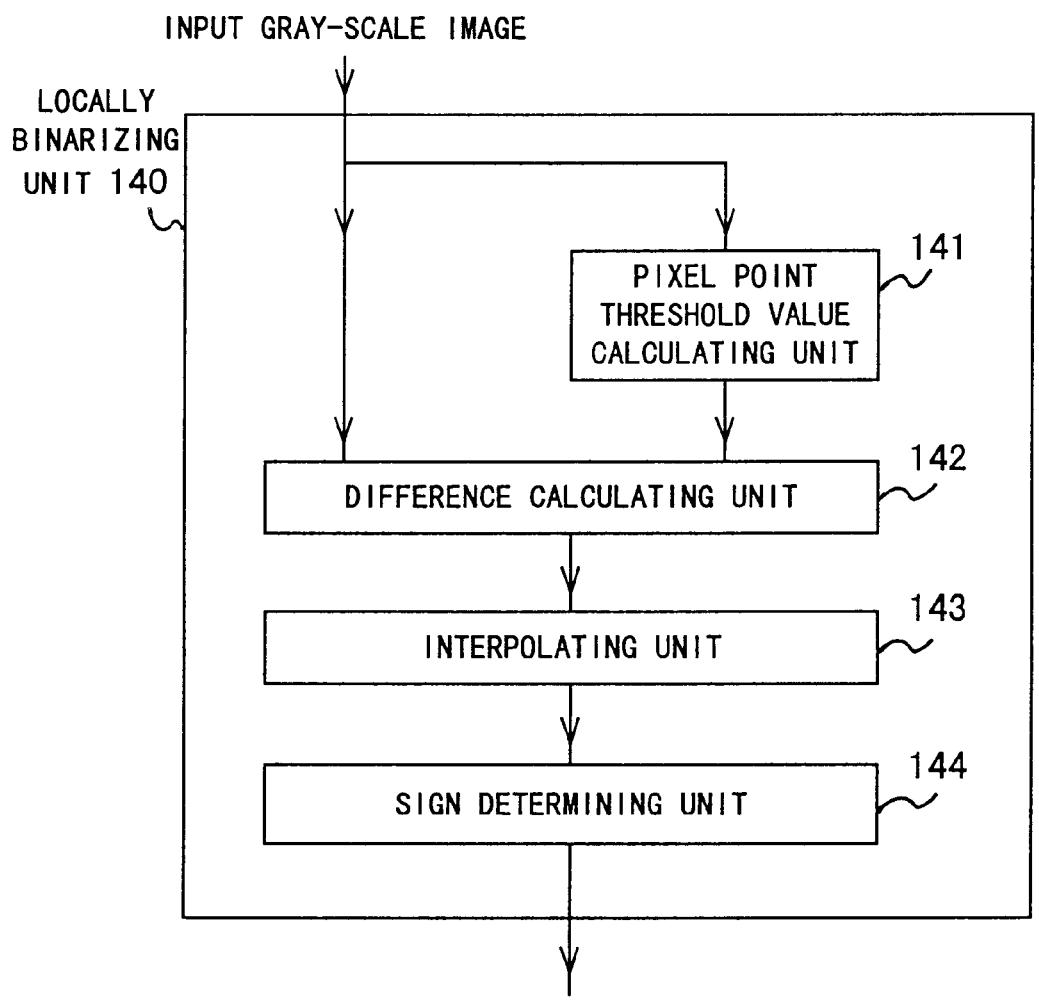
FIG. 15 exemplifies a sixth configuration of the locally binarizing unit.

FIG. 15 is a block diagram exemplifying the sixth configuration of the locally binarizing unit.

With this configuration, the value obtained by interpolating the difference between the pixel value at an original pixel point of a gray-scale image and the local threshold value after the subpixel generation process, at an interpolation point (subpixel), and the value of the binary image at the interpolation point, are determined with the sign of the interpolation value. Because the interpolation process is reduced from twice to once with this configuration, the processing speed can be improved. Especially, if the subpixel generation process is performed with the linear interpolation method, the same effects as those in the case where respective original pixels are interpolated and compared can be obtained.

> the subpixel value for {original pixel value−binarization threshold value}=the value obtained by performing the subpixel generation process for original pixel values−the value obtained by performing the subpixel generation process for a binarization threshold value That is, the locally binarizing unit 140 is composed of a pixel point threshold value calculating unit 140, a difference calculating unit 142, an interpolating unit 143, and a sign determining unit 144.

The data of an input gray-scale image are directly input to the difference calculating unit 142, and to the pixel point threshold value calculating unit 141. The pixel point threshold value calculating unit 141 calculates the threshold value within a local area only from the original pixel values included in the local area for the original pixel point of the input gray-scale image, and generates the threshold value for a targeted original pixel. Next, the targeted original pixel value and the generated threshold value are input to the difference calculating unit 142, which calculates the difference between them. The value of a subpixel is then obtained by interpolating this difference in a similar manner as in the above described process for interpolating the level of brightness (gray scale). Since the obtained value is the same as the value of the difference between the value of the subpixel and the threshold value, the difference from the value of the original pixel and that of the subpixel are input to the sign determining unit 144, which examines the sign of the difference.

For example, if the pixel value is larger than the threshold value, the above described difference becomes positive, and, for example, the value "0" is assigned to this pixel when being binarized. If the pixel value is smaller than the threshold value, the difference becomes negative, and, for example, the value "1" is assigned to the pixel when being binarized. By performing such a process for all of the pixel points, a binary image can be obtained.

Figure 16:
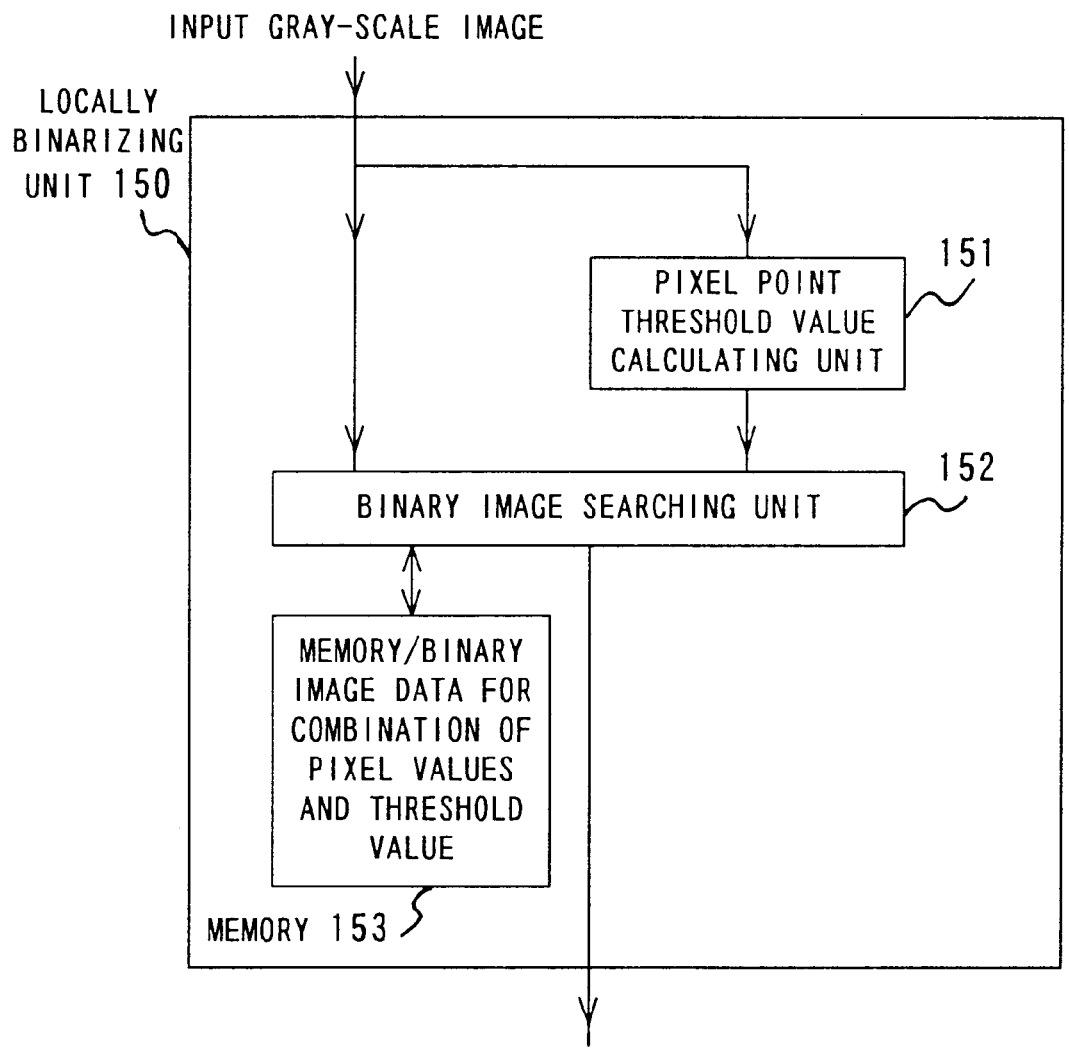
FIG. 16 exemplifies a seventh configuration of the locally binarizing unit.

FIG. 16 is a block diagram exemplifying the seventh configuration of the local binarizing unit.

With this configuration, a binary image is obtained by obtaining the local threshold value after the subpixel generation process at each pixel point of a gray-scale image, and by using the table to which the values at 4 pixel points of the gray-scale image and the local threshold value and from which the binary image enclosed by 4 pixel points is output as data.

Namely, a locally binarizing unit 150 is composed of a pixel point threshold value calculating unit 151, a binary image searching unit 152, and a memory 153. The pixel point threshold value calculating unit 151 obtains the threshold value in a local area from the pixel values of the input gray-scale image for each of the pixels, and provides it to the binary image searching unit 152. The binary image searching unit 152 receives the threshold values from the pixel point threshold value calculating unit 151 and the original pixel values of the gray-scale image, and selects 4 original pixels forming the regular square which is a minimum unit of the grid formed by original pixel points. Then, a binary image is obtained by referencing the table stored in the memory 153 based on the pixel values and the threshold values of the 4 original pixels. The table stored in the memory 153 is a table to which the binary image data is registered for the combination of the pixel values and the threshold values of 4 original pixels. The binary image searching unit 152 obtains the binary image data for all of unit grids (minimum regular squares forming a grid) structured by the original pixels of the input gray-scale image according to this table, generates an entire binary image by combining the data, and outputs the generated image.

Only the explanations about the configurations of the variable resolution binarizing unit were provided above. However, as shown in FIG. 6, the rough extraction process for roughly extracting a drawing area is initially performed for a gray-scale image, and the above described process is performed only for the extracted drawing area, thereby reducing the amount of processing time.

Figure 17:
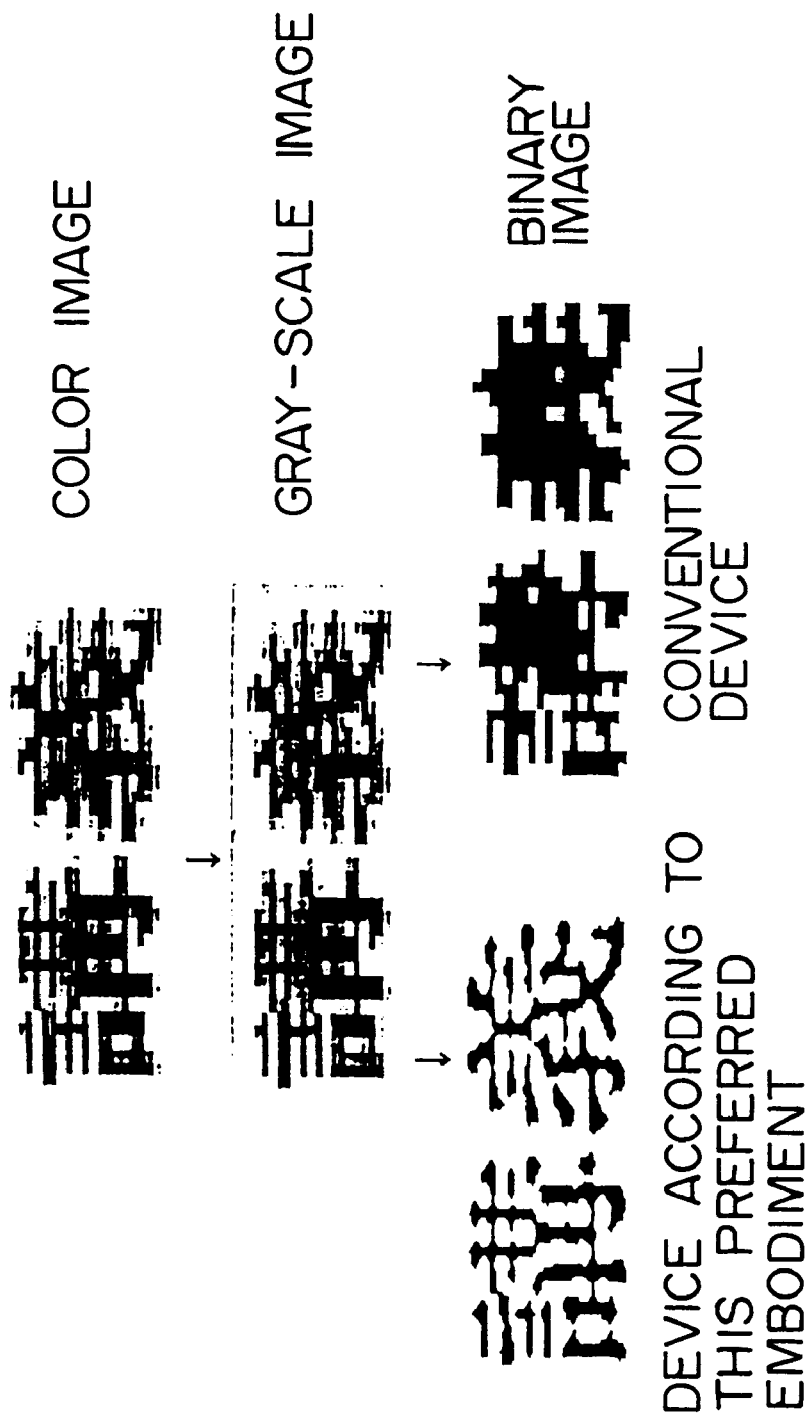
FIG. 17 is a schematic diagram exemplifying the processing up to the process for binarizing a color or gray-scale image with the process according to the preferred embodiment (No. 1)
Figure 18:
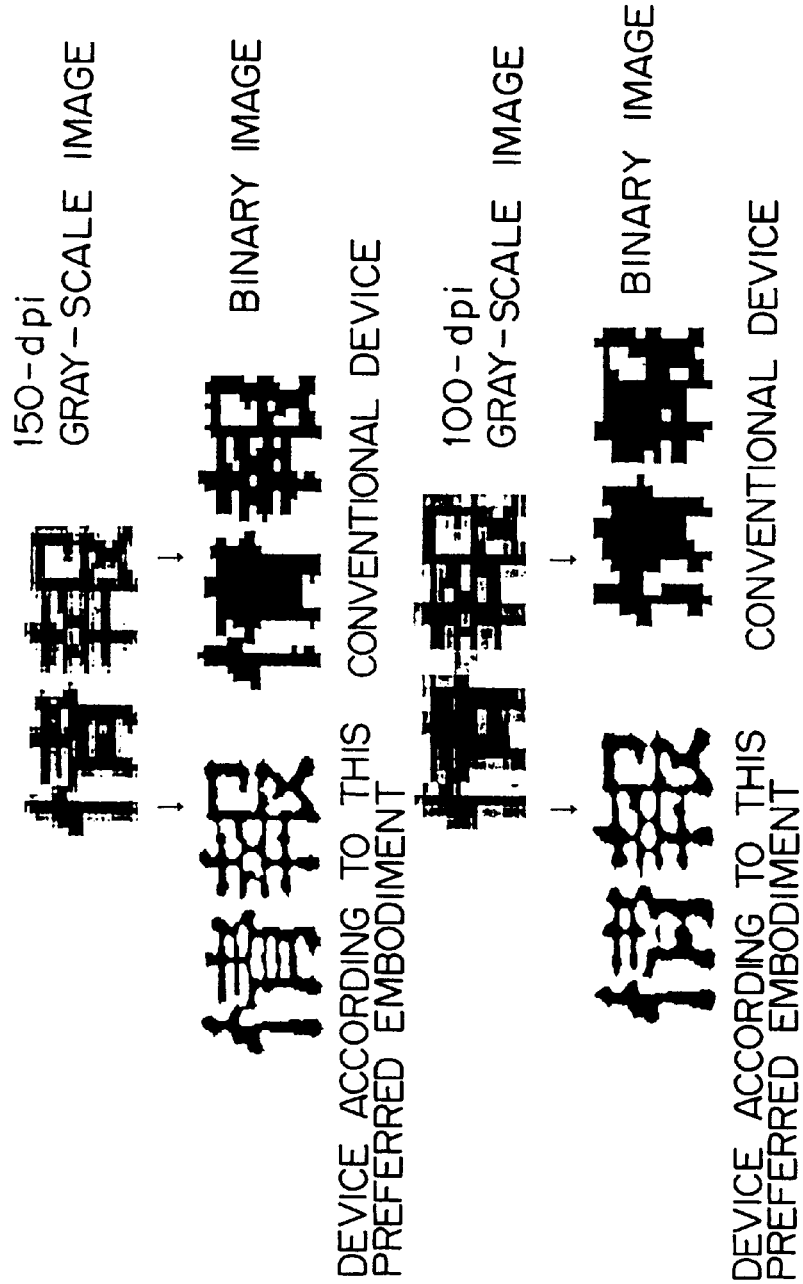
FIG. 18 is a schematic diagram exemplifying the processing up to the process for binarizing a color or gray-scale image with the process according to the preferred embodiment (No. 2)

FIG. 17 shows the processing examples up to the process for binarizing a color image, and FIG. 18 shows a gray-scale image according to this preferred embodiment.

FIG. 17 shows the processing example of a 150-dpi color image.

The top image is a color image document with a resolution of 150 dpi. In an actual color image, various colors appear around a black color representing characters. The top color image converted into a gray-scale image is shown as a middle image. The gray-scale image binarized with the conventional method is the binary image on the right at the bottom. Viewing this image, the detailed portions of the characters are defaced and the characters are difficult to recognize. In the meantime, the binary image obtained by performing the processing according to this preferred embodiment is the image on the left at the bottom. Since subpixels are generated according to this preferred embodiment, the resolution of the binary image is substantially higher than that of the original color image. In this case, the amount of information increases. However, since the binary image data is used not for printing by a printer, etc, but for charter recognition as it is, the clearer representation of the characters facilitates the character recognition.

FIG. 18 shows the processing example of 150- and 100-dpi gray-scale images.

If the 150- and 100-dpi gray-scale images are binarized by a conventional process, an erroneous character recognition result may often be obtained due to the defacement of the characters. In the meantime, according to this preferred embodiment, subpixels are generated and the information about the levels of brightness can be prevented from being lost, whereby the characters can be recognized more clearly, and a higher recognition rate can be realized when the character recognition process is performed.

Figure 19:
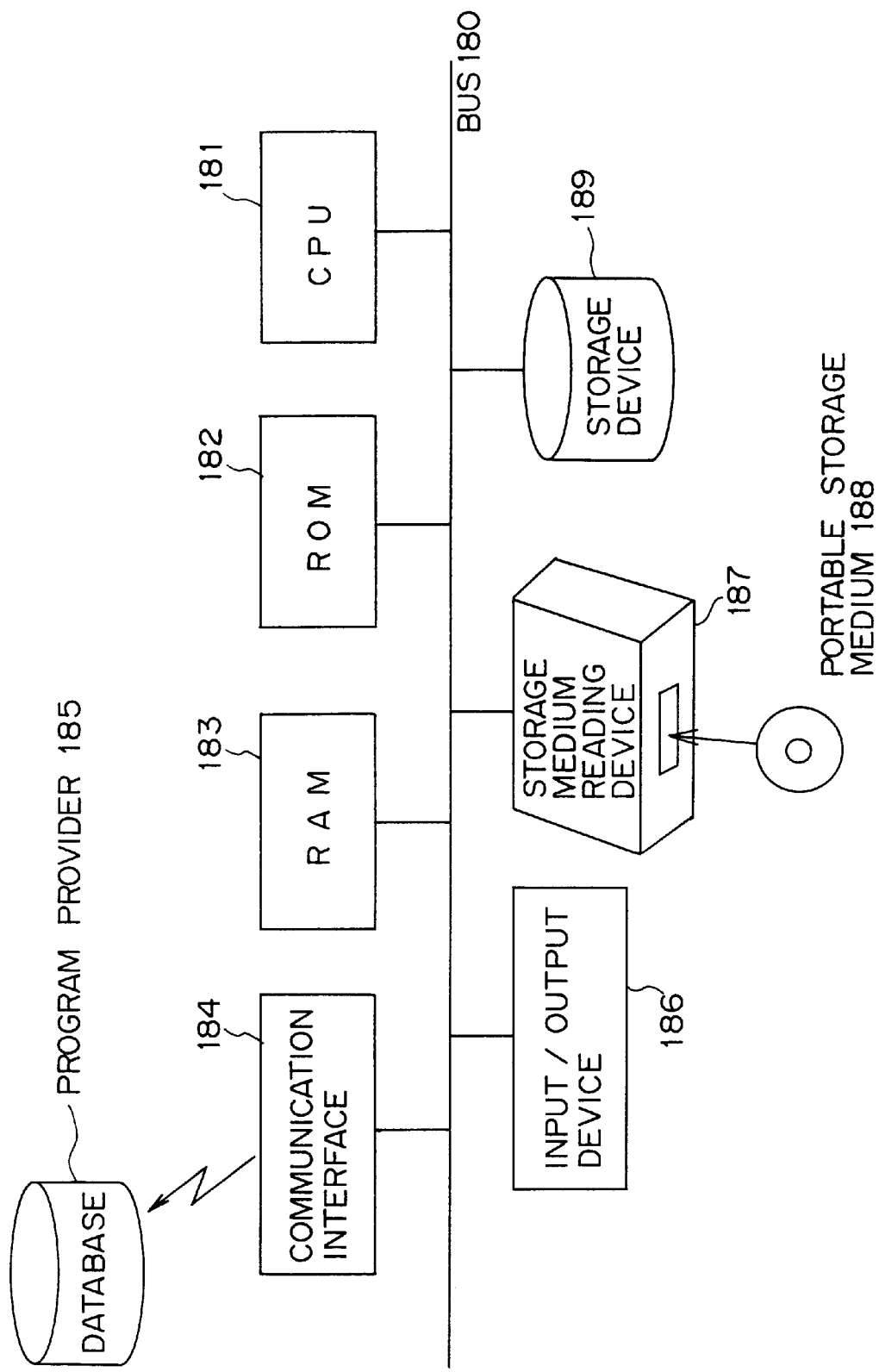
FIG. 19 is a block diagram explaining the configuration of the hardware required for implementing the preferred embodiment as software.

FIG. 19 is a block diagram explaining the configuration of the hardware required for implementing this preferred embodiment as software.

In this preferred embodiment, the subpixel generation process, the interpolation process, the threshold value calculation process, etc. can be implemented as a program running on a computer. In this case, as the hardware configuration required for the computer, a CPU 181 for performing the above described processes, a RAM 183 for storing the program for performing these processes in an executable form, etc. must be interconnected by a bus 180, so that they can communicate with each other. Furthermore, a ROM 182 for storing the BIOS required for running the CPU 181, a storage device 189 for storing the program, etc. are arranged. The storage device 189 is implemented, for example, as a hard disk, etc. In addition, a storage medium reading device 187 is required when the program is stored onto a portable storage medium 188 such as a floppy disk, a CD-ROM, etc. and used. The program read from the storage device 189 or the portable storage medium 188 is expanded and stored in the RAM 183 so that the CPU 181 can execute it. Furthermore, an input/output device 186 composed of a monitor, a keyboard, a mouse, etc. is arranged in order to transmit to the CPU 181 the commands issued by a user who operates the device, and to display the results of the processes performed by the CPU 181 for the user.

Furthermore, the program may not be stored in a computer used by a user. It may be used depending on need by being downloaded from a database possessed by a program provider 185. Or, the program may be executed in a network by connecting the user and the program provider 185 via a LAN. Only a command input and a result display are performed by the computer possessed by the user in this case.

As described above in detail, according to the present invention, a color or gray-scale document image can be quickly binarized with high accuracy, thereby recognizing the image accurately and rapidly.

What is claimed is:

1. A document image recognizing device, comprising:
   image converting means for converting an input document image into a gray-scale image if the input document image is a color image, and for newly outputting a gray-scale image if the input image is a gray-scale image;
   variable resolution binarizing means for converting the input document image into a binary image having a higher resolution according to a resolution of the gray-scale image; wherein said variable resolution binarizing means performs a sub-pixel generation process for increasing a number of pixels included in an image by interpolating pixel values ofa gray-scale image, sets a local threshold value within a local area centering around a particular pixel, and obtains a binary image by using the local threshold value; and
   recognizing means for recognizing the binarized image.

2. The device according to claim 1, wherein:
   said recognizing means recognizes a converted or input binary image, and converts the binary image into electronic codes.

3. The device according to claim 1, further comprising:
   drawing area roughly extracting means for roughly extracting a drawing area according to a global threshold value for pixel values of a gray-scale image, wherein
   said recognizing means recognizes a binary image in an area extracted by said drawing area roughly extracting means.

4. The device according to claim 3, wherein:
   the global threshold value uses a linear combination of an average pixel value, a standard deviation value, and a variance.

5. The device according to claim 3, wherein
   said variable resolution binarizing means performs the subpixel generation process for an entire input gray-scale image; and
   said drawing area roughly extracting means roughly extracts a drawing area from gray-scale image data for which the subpixel generation process is performed.

6. The device according to claim 1, wherein:
   the subpixel generation process is performed by linearly interpolating original pixel values of the gray-scale image.

7. The device according to claim 1, wherein:
   said variable resolution binarizing means obtains a binary image by binarizing pixel values by using the local threshold value obtained from a distribution of the pixel values within a local area including pixels; and
   the local threshold value uses a linear combination of an average pixel value, a standard deviation value, and a variance.

8. The device according to claim 1, further comprising:
   drawing area roughly extracting means for performing a global process which roughly extracts a drawing area according to a global threshold value for pixel values of a gray-scale image, wherein
   said variable resolution binarizing means performs the subpixel generation process for increasing a number of pixels included in an image by interpolating pixel values of a gray-scale image, for a drawing area which is roughly extracted with the global process, and performs a local binarization process by using the local threshold value for each pixel included in the roughly extracted drawing area.

9. The device according to claim 1, wherein the local threshold value at a pixel point after the subpixel generation process is based on obtaining a value of a subpixel generated with the subpixel generation process from original pixel values, and obtaining a local threshold value from subpixel values.

10. The device according to claim 1, wherein a local threshold value after the subpixel generation process is obtained at a pixel point of a gray-scale image, and a local threshold value of a subpixel is obtained by interpolating local threshold values at pixel points of the gray-scale image.

11. The device according to claim 10, wherein the local threshold value at the pixel point of the gray-scale image is obtained by using a value of a subpixel obtained by performing the subpixel generation process for pixel points of the gray-scale image.

12. The device according to claim 10, wherein the local threshold value at the pixel point of the gray-scale image after the subpixel generation process is based on obtaining a subpixel value from original pixel values, and obtaining a local threshold value from subpixel values.

13. The device according to claim 12, wherein the local threshold value is obtained, using subpixel values, from a local threshold value from a local area that recognizes original pixels as its boundary.

14. The device according to claim 10, wherein an interpolation value at a subpixel point is obtained by interpolating a difference between a value at a pixel point of a gray-scale image and a local threshold value after the subpixel generation process, and a value of a binary image at the subpixel point is determined with a sign of the interpolation value.

15. The device according to claim 1, wherein a local threshold value at an original pixel point of a gray-scale image after the subpixel generation process is obtained from a linear combination of an average value, a standard deviation value, and a variance, by obtaining the standard deviation value and the variance after obtaining the average value and a square average value of values at pixel points of the gray-scale image, for which the subpixel generation process is performed, based on obtaining a subpixel value from original pixel values, and obtaining the average value and the square average value from subpixel values.

16. The device according to claim 1, wherein:
the local area recognizes original pixels as its boundary; and
a local threshold value at an original pixel point of a gray-scale image after the subpixel generation process is obtained from a linear combination of an average value, a standard deviation value, and a variance, by obtaining the standard deviation value and the variance after obtaining the average value and a square average value of values at pixel points of the gray-scale image, for which the subpixel generation process is performed, based on obtaining a subpixel value from original pixel values, and obtaining the average value and the square average value from subpixel values.

17. The device according to claim 1, further comprising:
specifying means for specifying a range of a local area, wherein
whether or not the local area recognizes original pixels as its boundary is determined by using as specification data a number of subpixels generated with the subpixel generation process and a size of the local area.

18. The device according to claim 1, wherein:
a local threshold value after the subpixel generation process is obtained at a pixel point of a gray-scale image;
a table to which pixel values and local threshold values at four pixel points of a gray-scale are input and from which a binary image enclosed by the four pixel points is output as data, is included; and
a binary image is obtained by using said table.

19. A document image recognizing method, comprising:
converting an input document image into a gray-scale image if the input document image is a color image, and newly outputting a gray-scale image if the input image is a gray-scale image;
converting the input document image into a binary image having a higher resolution according to a resolution of the gray-scale image; wherein said converting the input document image into a binary image performs a subpixel generation process for increasing a number of pixels included in an image by interpolating pixel values of a gray-scale image, sets a local threshold value within a local area centering around a particular pixel, and obtains a binary image by using the local threshold value; and
recognizing the binary image.

20. The method according to claim 19, wherein:
said recognizing the binary image recognizes a converted or input binary image, and converts the binary image into electronic codes.

21. The method according to claim 20, further comprising:
roughly extracting a drawing area according to a global threshold value for pixel values of a gray-scale image, wherein
said recognizing the binary image recognizes a binary image in an area extracted by said roughly extracting a drawing area.

22. The method according to claim 21, wherein the global threshold value uses a linear combination of an average pixel value, a standard deviation value, and a variance.

23. The method according to claim 21, wherein:
said converting the input document image into a binary image performs the subpixel generation process for an entire input gray-scale image; and
said roughly extracting a drawing area roughly extracts a drawing area from gray-scale image data for which the subpixel generation process is performed.

24. The method according to claim 19, wherein:
the subpixel generation process is performed by linearly interpolating original pixel values of the gray-scale image.

25. The method according to claim 19, wherein:
said converting the input document image into a binary image obtains a binary image by binarizing pixel values by using the local threshold value obtained from a distribution of the pixel values within a local area including pixels; and
the local threshold value uses a linear combination of an average pixel value, a standard deviation value, and a variance.

26. The method according to claim 19, further comprising:
performing a global process which roughly extracts a drawing area according to a global threshold value for pixel values of a gray-scale image, wherein
said converting the input document image into a binary image performs the subpixel generation process for increasing a number of pixels included in an image by interpolating pixel values of a gray-scale image, for a drawing area which is roughly extracted with the global process, and performs a local binarization process by using the local threshold value for each pixel included in the roughly extracted drawing area.

27. The method according to claim 19, wherein the local threshold value at a pixel point after the subpixel generation process is based on obtaining a value of a subpixel generated with the subpixel generation process from original pixel values, and obtaining a local threshold value from subpixel values.

28. The method according to claim 19, wherein a local threshold value after the subpixel generation process is obtained at a pixel point of a gray-scale image, and a local threshold value of a subpixel is obtained by interpolating local threshold values at pixel points of the gray-scale image.

29. The method according to claim 28, wherein the local threshold value at the pixel point of the gray-scale image after the subpixel generation process is based on obtaining a subpixel value from original pixel values, and obtaining a local threshold value from subpixel values.

30. The method according to claim 29, wherein the local threshold value is obtained, using subpixel values, from a local threshold value within a local area that recognizes original pixels as its boundary.

31. The method according to claim 28, wherein an interpolation value at a subpixel point is obtained by interpolating a difference between a value at a pixel point of a gray-scale image and a local threshold value after the subpixel generation process, and a value of a binary image at the subpixel point is determined by a sign of the interpolation value.

32. The method according to claim 19, wherein the local threshold value at the pixel point of the gray-scale image is obtained by using a value of a subpixel obtained by performing the subpixel generation process for pixel points of the gray-scale image.

33. The method according to claim 19, wherein a local threshold value at an original pixel point of a gray-scale image after the subpixel generation process is obtained from a linear combination of an average value, a standard deviation value, and a variance, by obtaining the standard deviation value and the variance after obtaining the average value and a square average value of values at pixel points of the gray-scale image, for which the subpixel generation process is performed, based on obtaining a subpixel value from original pixel values, and obtaining the average value and the square average value from subpixel values.

34. The method according to claim 19, wherein:

the local area recognizes original pixels as its boundary; and a local threshold value at an original pixel point of a gray-scale image after the subpixel generation process is obtained from a linear combination of an average value, a standard deviation value, and a variance, by obtaining the standard deviation value and the variance after obtaining the average value and a square average value of values at pixel points of the gray-scale image, for which the subpixel generation process is performed, based on obtaining a subpixel value from original pixel values, and obtaining the average value and the square average value from subpixel values.

35. The method according to claim 19, further comprising:

specifying a range of a local area, wherein whether or not the local area recognizes original pixels as its boundary is determined by using as specification data a number of subpixels generated with the subpixel generation process and a size of the local area.

36. The method according to claim 19, wherein:

a local threshold value after the subpixel generation process is obtained at a pixel point of a gray-scale image;

a table to which pixel values and local threshold values at four pixel points of a gray-scale are input and from which a binary image enclosed by the four pixel points is output as data, is included; and a binary image is obtained by using said table.

37. A computer-readable storage medium for directing a computer to execute a process comprising:

converting an input document image into a gray-scale image if the input document image is a color image, and newly outputting a gray-scale image if the input image is a gray-scale image;

converting the input document image into a binary image having a higher resolution according to a resolution of a gray-scale image; wherein said converting the input document image into a binary image performs a subpixel generation process for increasing a number of pixels included in an image by interpolating pixel values of a gray-scale image, sets a local threshold value within a local area centering around a particular pixel, and obtains a binary image by using the local threshold value; and recognizing the binary image.

38. The storage medium according to claim 37, wherein:

said recognizing the binary image recognizes a converted or input binary image, and converts the binary image into electronic codes.

39. The storage medium according to claim 37, wherein the process further comprises:

roughly extracting a drawing area according to a global threshold value for pixel values of a gray-scale image, and wherein said recognizing the binary image recognizes a binary image in an area extracted by said roughly extracting a drawing area.

40. The storage medium according to claim 39, wherein the global threshold value uses a linear combination of an average pixel value, a standard deviation value, and a variance.

41. The storage medium according to claim 39, wherein:

said converting the input document image into a binary image performs the subpixel generation process for an entire input gray-scale image; and said roughly extracting a drawing area roughly extracts a drawing area from gray-scale image data for which the subpixel generation process is performed.

42. The storage medium according to claim 39, wherein the subpixel generation process is performed by linearly interpolating original pixel values of the gray-scale image.

43. The storage medium according to claim 37, wherein:

said converting the input document image into a binary image obtains a binary image by binarizing pixel values by using the local threshold value obtained from a distribution of the pixel values within a local area including pixels; and the local threshold value uses a linear combination of an average pixel value, a standard deviation value, and a variance.

44. The storage medium according to claim 37, further comprising:

performing a global process which roughly extracts a drawing area according to a global threshold value for pixel values of a gray-scale image, and wherein said converting the input document image into a binary image performs the subpixel generation process for increasing a number of pixels included in an image by interpolating pixel values of a gray-scale image, for a drawing area which is roughly extracted with the global process, and performs a local binarization process by using the local threshold value for each pixel included in the roughly extracted drawing area.

45. The storage medium according to claim 37, wherein the local threshold value at a pixel point after the subpixel generation process is based on obtaining a value of a subpixel generated with the subpixel generation process from original pixel values, and obtaining a local threshold value from subpixel values.

46. The storage medium according to claim 37, wherein a local threshold value after the subpixel generation process is obtained at a pixel point of a gray-scale image, and a local threshold value of a subpixel is obtained by interpolating local threshold values at pixel points of the gray-scale image.

47. The storage medium according to claim 46, wherein the local threshold value at the pixel point of the gray-scale image is obtained by using a value of a subpixel obtained by performing the subpixel generation process for pixel points of the gray-scale image.

48. The storage medium according to claim 46, wherein the local threshold value at the pixel point of the gray-scale image after the subpixel generation process is based on obtaining a subpixel value from original pixel values, and obtaining a local threshold value from subpixel values.

49. The storage medium according to claim 48, wherein the local threshold value is obtained, using subpixel values, from a local threshold value within a local area that recognizes original pixels as its boundary.

50. The storage medium according to claim 46, wherein an interpolation value at a subpixel point is obtained by interpolating a difference between a value at a pixel point of a gray-scale image and a local threshold value after the subpixel generation process, and a value of a binary image at the subpixel point is determined with a sign of the interpolation value.

51. The storage medium according to claim 37, wherein a local threshold value at an original pixel point of a gray-scale image after the subpixel generation process is obtained from a linear combination of an average value, a standard deviation value, and a variance, by obtaining the standard deviation value and the variance after obtaining the average value and a square average value of values at pixel points of the gray-scale image, for which the subpixel generation process is performed, based on obtaining a subpixel value from original pixel values, and obtaining the average value and the square average value from subpixel values.

52. The storage medium according to claim 37, wherein:
the local area recognizes original pixels as its boundary; and
a local threshold value at an original pixel point of a gray-scale image after the subpixel generation process is obtained from a linear combination of an average value, a standard deviation value, and a variance, by obtaining the standard deviation value and the variance after obtaining the average value and a square average value of values at pixel points of the gray-scale image, for which the subpixel generation process is performed, based on obtaining a subpixel value from original pixel values, and obtaining the average value and the square average value from subpixel values.

53. The storage medium according to claim 37, further comprising:
specifying a range of a local area, and wherein
whether or not the local area recognizes original pixels as its boundary is determined by using as specification data a number of subpixels generated with the subpixel generation process and a size of the local area.

54. The storage medium according to claim 37, wherein:
a local threshold value after the subpixel generation process is obtained at a pixel point of a gray-scale image;
a table to which pixel values and local threshold values at four pixel points of a gray-scale are input and from which a binary image enclosed by the four pixel points is output as data, is included; and
a binary image is obtained by using said table.

* * * * *

UNITED STATES PATENT AND TRADEMARK OFFICE
CERTIFICATE OF CORRECTION

PATENT NO.   : 6,347,156 B1                                Page 1 of 1
DATED        : February 12, 2002
INVENTOR(S)  : Hiroshi Kamada et al.

It is certified that error appears in the above-identified patent and that said Letters Patent is hereby corrected as shown below:

Column 21,
Line 60, after "image;" insert -- and recognizing means for recognizing the binarized image, --
Line 63, change "ofa" to -- of a --.
Line 66, change "; and" to -- . --
Line 67, delete the line.

Column 23,
Line 66, after "image;" insert -- and recognizing the binary image --

Column 24,
Line 3, change "," to -- . -- and delete the rest of the line.
Lines 4-7, delete the lines in their entirety.

Column 26,
Line 5, after "image" insert -- ; and recognizing the binary image, -- and delete the rest of the line.
Line 12, change "; and" to -- . --
Line 13, delete the line.

Signed and Sealed this

Thirteenth Day of August, 2002

Attest:

JAMES E. ROGAN
Attesting Officer    Director of the United States Patent and Trademark Office